United States Patent
Osawa et al.

(10) Patent No.: US 9,978,368 B2
(45) Date of Patent: May 22, 2018

(54) INFORMATION PROVIDING SYSTEM

(71) Applicant: MITSUBISHI ELECTRIC CORPORATION, Tokyo (JP)

(72) Inventors: Masanobu Osawa, Tokyo (JP); Takumi Takei, Tokyo (JP); Yuki Furumoto, Tokyo (JP); Tomohiro Narita, Tokyo (JP); Tatsuhiko Saito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 46 days.

(21) Appl. No.: 15/315,506

(22) PCT Filed: Sep. 16, 2014

(86) PCT No.: PCT/JP2014/074412
§ 371 (c)(1),
(2) Date: Dec. 1, 2016

(87) PCT Pub. No.: WO2016/042600
PCT Pub. Date: Mar. 24, 2016

(65) Prior Publication Data
US 2017/0200448 A1 Jul. 13, 2017

(51) Int. Cl.
*G10L 15/22* (2006.01)
*G10L 15/10* (2006.01)
*G10L 15/18* (2013.01)
*G10L 15/08* (2006.01)
*G10L 15/26* (2006.01)

(52) U.S. Cl.
CPC .............. *G10L 15/22* (2013.01); *G10L 15/10* (2013.01); *G10L 15/1815* (2013.01); *G10L 15/26* (2013.01); *G10L 2015/088* (2013.01); *G10L 2015/223* (2013.01)

(58) Field of Classification Search
CPC ..... G10L 15/22; G10L 15/10; G10L 15/1815; G10L 2015/088; G10L 2015/223; G10L 15/26
See application file for complete search history.

(56) References Cited

U.S. PATENT DOCUMENTS 5,680,511 A * 10/1997 Baker ................ G10L 15/1815
704/257
5,924,068 A * 7/1999 Richard ................ G10L 13/00
345/901

(Continued)

FOREIGN PATENT DOCUMENTS

GB 2407657 A * 5/2005 ........... G06F 17/271
JP 8-137883 A 5/1996
(Continued)

*Primary Examiner* — Brian L Albertalli
(74) *Attorney, Agent, or Firm* — Birch, Stewart, Kolasch & Birch, LLP

(57) ABSTRACT

Because an information providing system according to the present invention generates recognition object words for selecting one headline from a plurality of headlines in such a way that the recognition object words do not overlap one another, the information providing system can select a headline uniquely through the user's utterance, and present information (content) corresponding to the headline selected thereby, and therefore the convenience to the user is improved.

9 Claims, 15 Drawing Sheets

(56) References Cited

U.S. PATENT DOCUMENTS

| | | | | |
|---|---|---|---|---|
| 6,470,307 | B1* | 10/2002 | Turney | G06F 17/3061 |
| | | | | 704/9 |
| 6,708,150 | B1* | 3/2004 | Hirayama | G01C 21/3608 |
| | | | | 704/243 |
| 6,937,986 | B2* | 8/2005 | Denenberg | H04M 3/4936 |
| | | | | 379/88.17 |
| 7,729,899 | B2* | 6/2010 | Otsuka | G06F 17/30666 |
| | | | | 704/2 |
| 2005/0251393 | A1 | 11/2005 | Georgescu | |
| 2008/0162136 | A1* | 7/2008 | Agapi | H04M 3/4938 |
| | | | | 704/251 |
| 2010/0169095 | A1* | 7/2010 | Asano | G06F 17/30746 |
| | | | | 704/251 |
| 2011/0087486 | A1* | 4/2011 | Schiller | G06Q 40/06 |
| | | | | 704/9 |
| 2014/0223310 | A1* | 8/2014 | Divay | G06F 3/167 |
| | | | | 715/727 |
| 2016/0034458 | A1* | 2/2016 | Choi | G10L 15/06 |
| | | | | 704/251 |

FOREIGN PATENT DOCUMENTS

| | | |
|---|---|---|
| JP | 2003-99089 A | 4/2003 |
| JP | 2003-141117 A | 5/2003 |
| JP | 2004-70876 A | 3/2004 |
| JP | 2004-234389 A | 8/2004 |
| JP | 2012-43046 A | 3/2012 |

\* cited by examiner

FIG.5

| Headline | Content (News Text) |
|---|---|
| Rakudai Nihon shirizu hatsu shinshutsu (Rakudai advances to the Japan series for the first time) | Rakudai ga kyo no Tobu-sen ni ichitaizero de shori shita tame hatsu no Nihon shirizu shinshutsu ga kettei shimashita (Because Rakudai won today's game against Tobu by 1-0, it is decided that Rakudai advances to the Japan series for the first time) |
| Darvi ga nohitto noran nogasu (Darvi let a no-hitter slip away) | Darvi wa kyukai tsuauto no jyokyo de yoban Maku ni hitto wo utare nohitto noran wo nogashimashita (Darvi allowed a hit to Mark, the fourth batter, with two outs in the ninth inning, and let a no-hitter slip away) |
| Rakudai no Nakata ga dairigu e iseki wo kibo (Nakata of Rakudai wants to move to Major League Baseball) | Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball) |

FIG.6

| Recognition Object Word Candidate | Headline | Content (News Text) |
|---|---|---|
| Rakudai | Rakudai Nihon shirizu hatsu shinshutsu (Rakudai advances to the Japan series for the first time) | Rakudai ga kyo no Tobu-sen ni ichitaizero de shori shita tame hatsu no Nihon shirizu shinshutsu ga kettei shimashita (Because Rakudai won today's game against Tobu by 1-0, it is decided that Rakudai advances to the Japan series for the first time) |
| Darvi | Darvi ga nohitto noran nogasu (Darvi let a no-hitter slip away) | Darvi wa kyukai tsuauto no jyokyo de yoban Maku ni hitto wo utare nohitto noran wo nogashimashita (Darvi allowed a hit to Mark, the fourth batter, with two outs in the ninth inning, and let a no-hitter slip away) |
| Rakudai | Rakudai no Nakata ga dairigu e iseki wo kibo (Nakata of Rakudai wants to move to Major League Baseball) | Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball) |

FIG.7

| Recognition Object Word Candidate | Headline | Content (News Text) |
|---|---|---|
| ichibanme no Rakudai (First Rakudai) | Rakudai Nihon shirizu hatsu shinshutsu (Rakudai advances to the Japan series for the first time) | Rakudai ga kyo no Tobu-sen ni ichitaizero de shori shita tame hatsu no Nihon shirizu shinshutsu ga kettei shimashita (Because Rakudai won today's game against Tobu by 1-0, it is decided that Rakudai advances to the Japan series for the first time) |
| Darvi | Darvi ga nohitto noran nogasu (Darvi let a no-hitter slip away) | Darvi wa kyukai tsuauto no jyokyo de yoban Maku ni hitto wo utare nohitto noran wo nogashimashita (Darvi allowed a hit to Mark, the fourth batter, with two outs in the ninth inning, and let a no-hitter slip away) |
| sanbanme no Rakudai (Third Rakudai) | Rakudai no Nakata ga dairigu e iseki wo kibo (Nakata of Rakudai wants to move to Major League Baseball) | Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball) |

FIG.11

```
<HTML>
<HEAD>
<TITLE>News Flash</TITLE>
</HEAD>
<BODY>
<UL>
<LI><A HREF="news1.html"> Rakudai Nihon shirizu hatsu shinshutsu (Rakudai advances to the Japan series for the first time)</A>
<LI><A HREF="news2.html">Darvi ga nohitto noran nogasu (Darvi let a no-hitter slip away)</A>
<LI><A HREF="news3.html">Rakudai no Nakata ga dairigu e iseki wo kibo (Nakata of Rakudai wants to move to Major League Baseball)</A>
</UL>
</BODY>
</HTML>
```

FIG.14

| First Recognition Object Word Candidate | Second Recognition Object Word Candidate | Headline | Content (News Text) |
|---|---|---|---|
| Rakudai | Nihon Shirizu (Japan Series) | Rakudai Nihon shirizu hatsu shinshutsu (Rakudai advances to the Japan series for the first time) | Rakudai ga kyo no Tobu-sen ni ichitaizero de shori shita tame hatsu no Nihon shirizu shinshutsu ga kettei shimashita (Because Rakudai won today's game against Tobu by 1-0, it is decided that Rakudai advances to the Japan series for the first time) |
| Darvi | Nohitto (No-Hitter) | Darvi ga nohitto noran nogasu (Darvi let a no-hitter slip away) | Darvi wa kyukai tsuauto no jyokyo de yoban Maku ni hitto wo utare nohitto noran wo nogashimashita (Darvi allowed a hit to Mark, the fourth batter, with two outs in the ninth inning, and let a no-hitter slip away) |
| Rakudai | Nakata | Rakudai no Nakata ga dairigu e iseki wo kibo (Nakata of Rakudai wants to move to Major League Baseball) | Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball) |

FIG.15

| Recognition Object Word Candidate | Headline | Content (News Text) |
|---|---|---|
| Rakudai | Rakudai Nihon shirizu hatsu shinshutsu (Rakudai advances to the Japan series for the first time) | Rakudai ga kyo no Tobu-sen ni ichitaizero de shori shita tame hatsu no Nihon shirizu shinshutsu ga kettei shimashita (Because Rakudai won today's game against Tobu by 1-0, it is decided that Rakudai advances to the Japan series for the first time) |
| Darvi | Darvi ga nohitto noran nogasu (Darvi let a no-hitter slip away) | Darvi wa kyukai tsuauto no jyokyo de yoban Maku ni hitto wo utare nohitto noran wo nogashimashita (Darvi allowed a hit to Mark, the fourth batter, with two outs in the ninth inning, and let a no-hitter slip away) |
| Rakudai | Rakudai no Nakata ga dairigu e iseki wo kibo (Nakata of Rakudai wants to move to Major League Baseball) | Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball) |

FIG.16

| Recognition Object Word Candidate | Headline | Content (News Text) |
|---|---|---|
| Nihon Shirizu (Japan Series) | Rakudai Nihon shirizu hatsu shinshutsu (Rakudai advances to the Japan series for the first time) | Rakudai ga kyo no Tobu-sen ni ichitaizero de shori shita tame hatsu no Nihon shirizu shinshutsu ga kettei shimashita (Because Rakudai won today's game against Tobu by 1-0, it is decided that Rakudai advances to the Japan series for the first time) |
| Darvi | Darvi ga nohitto noran nogasu (Darvi let a no-hitter slip away) | Darvi wa kyukai tsuauto no jyokyo de yoban Maku ni hitto wo utare nohitto noran wo nogashimashita (Darvi allowed a hit to Mark, the fourth batter, with two outs in the ninth inning, and let a no-hitter slip away) |
| Nakata | Rakudai no Nakata ga dairigu e iseki wo kibo (Nakata of Rakudai wants to move to Major League Baseball) | Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball) |

INFORMATION PROVIDING SYSTEM

TECHNICAL FIELD

The present invention relates to an information providing system that presents information to a user via either voice or a screen display.

BACKGROUND ART

Conventionally, an information providing device is known that displays a headline of a piece of news or the like on a display, or outputs a headline of a piece of news or the like via voice from a speaker, and, when a user utters a key word included in the headline, reads out or displays the text (content) of the news corresponding to the headline including the key word.

For example, patent literature 1 describes a voice recognition/synthesizer device that reads out a text described in HTML or the like, sets a keyword included in a link character string showing a description of information in a link destination as a voice recognition object, and, when this key word is uttered, and acquires and reads out the information (content) on the corresponding link destination.

CITATION LIST

Patent Literature

Patent Literature 1: Japanese Unexamined Patent Application Publication No. 2003-99089

SUMMARY OF INVENTION

Technical Problem

A problem with the conventional technology described in, for example, patent literature 1 is, however, that when key words extracted from a plurality of link character strings are overlapped, and the user utters the key word overlapping another key word, only a notification that there are a plurality of choices is provided, but a method of easily selecting information on one link destination through a voice operation is not provided, and therefore the user cannot easily acquire information (content) on his or her desired link destination.

The present invention is made in order to solve the above-mentioned problem, and it is therefore an object of the present invention to provide an information providing system that can easily select a desired headline from a plurality of headlines through a user's voice operation, and can present information (content) corresponding to the headline selected thereby to the user.

Solution to Problem

In order to achieve the above-mentioned object, according to the present invention, there is provided an information providing system that presents a plurality of headlines, selects one of the above-mentioned plurality of headlines, and presents a piece of content corresponding to the headline selected thereby, the information providing system including: an extractor to acquire the above-mentioned plurality of headlines, and to extract recognition object word candidates from the above-mentioned acquired headlines, respectively; an object word determiner to acquire the recognition object word candidates of the above-mentioned headlines from the above-mentioned extractor, and to generate recognition object words of the above-mentioned headlines in accordance with the above-mentioned acquired recognition object word candidates of the headlines; and a controller to, when a voice recognition result acquired from a voice matches a recognition object word generated by the above-mentioned object word determiner, issue a command to present a piece of content corresponding to a headline from which the recognition object word matching the above-mentioned voice recognition result is determined, in which when recognition object word candidates overlapping each other exist in the above-mentioned acquired recognition object word candidates of the headlines, the above-mentioned object word determiner dynamically generates the recognition object words of the above-mentioned headlines in such a way that the recognition object words of the above-mentioned headlines differ from one another.

Advantageous Effects of Invention

Because the information providing system according to the present invention determines the recognition object words for selecting one headline from the plurality of headlines in such a way that the recognition object words do not overlap one another, the information providing system can select a headline uniquely through the user's utterance, and present information (content) corresponding to the headline selected thereby, and therefore the convenience to the user is improved.

BRIEF DESCRIPTION OF DRAWINGS

FIG. 5 is a table showing an example of headlines and pieces of content (news body texts) respectively corresponding to the headlines, which are acquired by an analyzer;

FIG. 6 is a table showing results which an extractor according to Embodiment 1 acquires by extracting a recognition object word candidate from each of the headlines shown in FIG. 5, and bringing this recognition object word candidate into correspondence the headline;

FIG. 7 is a table showing an example of recognition object words of the headlines, the headlines, and the pieces of content (news body texts) respectively corresponding to the headlines, which are stored in a storage in Embodiment 1;

FIG. 11 is a diagram showing content information which the acquirer acquires via a network;

FIG. 14 is a table showing results which an extractor according to Embodiment 2 acquires by extracting a recognition object word candidate from each of the headlines shown in FIG. 5, and bringing this recognition object word candidate into correspondence the headline;

FIG. 15 is a table showing an example of recognition object words of the headlines, the headlines, and the pieces of content (news body texts) respectively corresponding to the headlines, which are stored in a storage in Embodiment 2;

FIG. 16 is a table showing an example of the recognition object words of the headlines, the headlines, and the pieces of content (news body texts) respectively corresponding to the headlines, which are stored in the storage in Embodiment 2 after the recognition object words are re-determined;

DESCRIPTION OF EMBODIMENTS

Hereafter, the preferred embodiments of the present invention will be explained in detail with reference to the drawings.

An information providing system according to the present invention presents a plurality of headlines, selects one headline from the plurality of headlines, and presents information (content) corresponding to the headline selected thereby.

Embodiment 1

Figure 1:
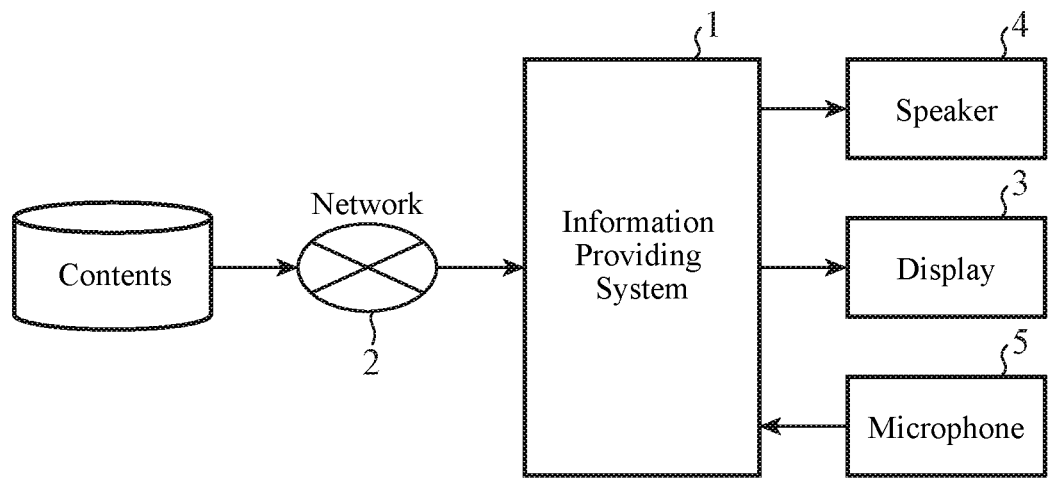
FIG. 1 is an explanatory drawing for explaining an outline of the operation of an information providing system according to Embodiment 1.

FIG. 1 is an explanatory drawing for explaining an outline of the operation of an information providing system according to Embodiment 1 of the present invention. The information providing system 1 acquires information (content information) via a network 2, and issues a command to present, via either display or voice, the headlines of pieces of content included in the content information acquired thereby to a display 3 or a speaker 4 (hereinafter referred to as a "display or the like") .

Then, when a recognition object word included in a headline is uttered by a user, the information providing system 1 selects this headline and issues a command to present (via either display or voice) the content corresponding to the headline selected thereby to the display or the like.

In this Embodiment 1, a case in which the information providing system 1 acquires news information, as the content information, via the network 2, and issues a command to present the headlines of the texts (pieces of content) of pieces of news included in the news information (content information) to the display or the like will be explained as a concrete example. Although the headlines, which will be shown below, are summary sentences in each of which a description of a piece of news is summarized, the present invention can be applied to any kinds of headlines as long as each of the headlines expresses a description of a piece of content.

Figure 2:
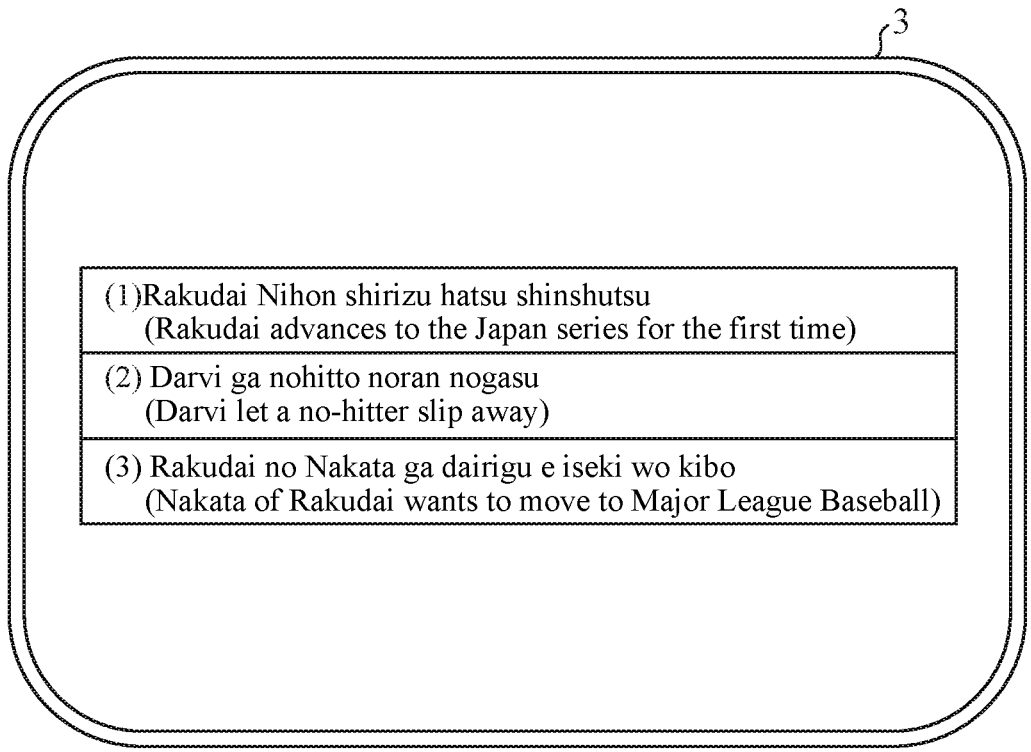
FIG. 2 is a diagram showing an example of a display screen in which the headlines of pieces of news are displayed on a display by the information providing system according to Embodiment 1.

FIG. 2 is a diagram showing an example of a display screen in which the headlines of pieces of news are displayed and which is displayed on the display 3 by the information providing system according to this Embodiment 1.

When a recognition object word included in a headline is then uttered by a user, the information providing system 1 selects the headline including the recognition object word, and issues a command to present the news body text corresponding to the selected headline to the display or the like.

For example, when a user utters "Darvi" in a situation in which three headlines: "Rakudai Nihon shirizu hatsu shinshutsu (Rakudai advances to the Japan Series for the first time)"; "Darvi ga nohitto noran nogasu (Darvi let a no-hitter slip away)"; and "Rakudai no Nakata ga dairigu e iseki wo kibo (Nakata of Rakudai wants to move to Major League Baseball)" are displayed, as the headlines of pieces of news, on the display 3, as shown in FIG. 2, the news body text corresponding to the headline "Darvi ga nohitto noran nogasu (Darvi let a no-hitter slip away)" is outputted via voice from the speaker 4, or displayed on the display 3.

Although the explanation will be made in this Embodiment 1 on the assumption that the "pieces of content" included in the content information are news body texts each of which is text information, the present embodiments are not limited to this example. Further, each "piece of content" is not limited to text information and can be an image (a still image, a moving image, a moving image including a sound, or the like). As a method of finally presenting a piece of content to the user, for example, a method of outputting only a sound included in a moving image may be applied. The same goes for the following embodiments.

Further, although the explanation will be made in this Embodiment 1 on the assumption that the "headlines" of the pieces of content correspond to news body texts (pieces of content) each of which is text information, the present embodiments are not limited to this example. However, each of the headlines is text information including a recognition object word which a user utters. The same goes for the following embodiments.

Figure 3:
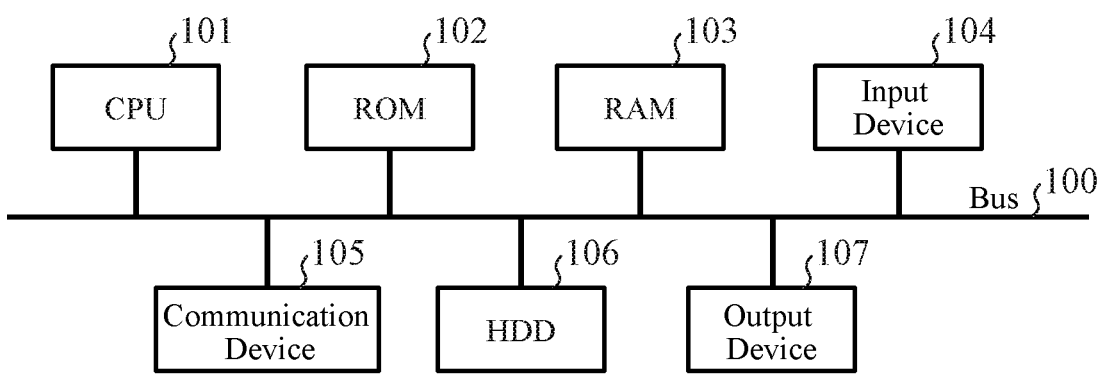
FIG. 3 is a schematic structural diagram showing the configuration of main hardware of the information providing system 1 according to Embodiment 1.

FIG. 3 is a schematic structural diagram showing the configuration of main hardware of the information providing system 1 according to this Embodiment 1. A CPU (Central Processing Unit) 101, a ROM (Read Only Memory) 102, a RAM (Random Access Memory) 103, an input device 104, a communication device 105, an HDD (Hard Disk Drive) 106 and an output device 107 are connected to a bus 100.

The CPU 101 works in cooperation with the pieces of hardware and implements various functions by reading out and executing various programs stored in the ROM 102 and various programs stored in the HDD 106.

The RAM 103 is a memory which is used at the time of execution of programs.

The input device 104 receives a user input, and includes a microphone, a remote controller, and a touch sensor.

The HDD 106 is an example of external storage units. As external storage units, in addition to the HDD, a CD, a DVD, a USB memory, and a storage, such as an SD card, using flash memories are included.

The output device 107 includes a speaker, a liquid crystal display, and an organic EL.

Figure 4:
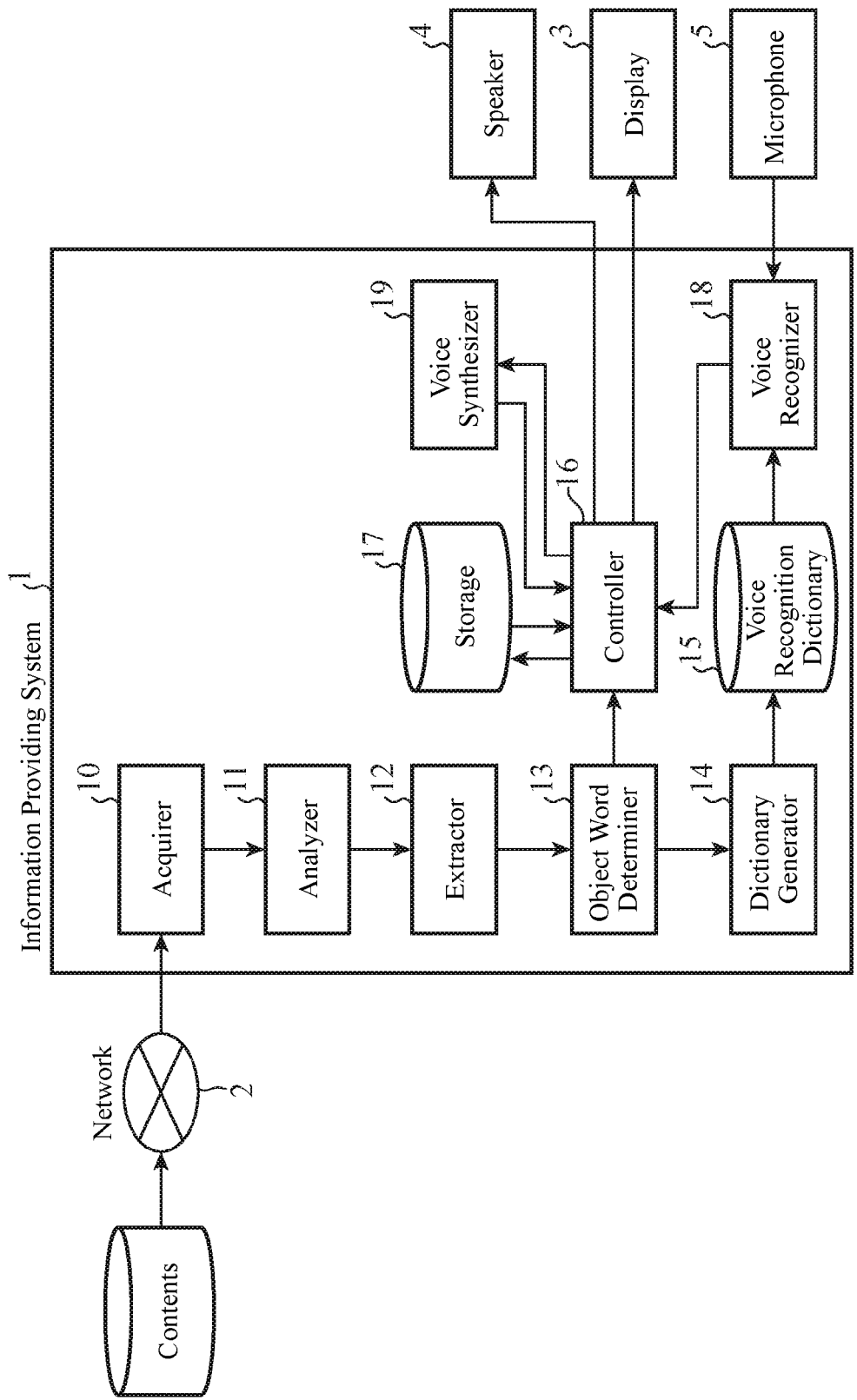
FIG. 4 is a block diagram showing an example of the information providing system according to Embodiment 1.

FIG. 4 is a block diagram showing an example of the information providing system 1 according to Embodiment 1 of the present invention. This information providing system 1 includes an acquirer 10, an analyzer 11, an extractor 12, an object word determiner 13, a dictionary generator 14, a voice recognition dictionary 15, a controller 16, a storage 17, a voice recognizer 18, and a voice synthesizer 19. These components can be decentralized among a server on the network, a mobile terminal such as a smart phone, vehicle-mounted equipment, and so on.

The acquirer 10 acquires content information described in an HTML (HyperText Markup Language) or XML (eXtensible Markup Language) form via the network 2. As the network 2, for example, the Internet or a public network, such as a network for mobile phones, can be used.

The analyzer 11 analyzes the content information acquired by the acquirer 10, and acquires a piece of content and the headline of this content. When plural pieces of content are included in the content information, the analyzer acquires all of the pieces of content and the headlines corresponding to the pieces of content.

For example, when a text is described in an HTML form as the content information, the analyzer 11 acquires the file specified by the href attribute of a <A> tag, such as "<A HREF="news1.html">Rakudai Nihon shirizu hatsu shinshutsu (Rakudai advances to the Japan series for the first time)</A>", via the acquirer 10, and acquires a description described in the acquired file as a piece of content.

Further, the analyzer acquires an anchor text specified by a </A> tag as the headline of a piece of content (described as a "headline" from here on). When there are a plurality of portions, each of which is specified by a </A> tag, the analyzer 11 performs the same process on all of the portions.

FIG. 5 is a table showing an example of a plurality of headlines acquired by the analyzer 11 and the pieces of content (news body texts) respectively corresponding to these headlines.

As shown in FIG. 5, it is assumed hereafter that the analyzer 11 analyzes the content information acquired from the acquirer 10, and acquires a headline "Rakudai Nihon shirizu hatsu shinshutsu (Rakudai advances to the Japan series for the first time)" and a piece of content (news body text) "Rakudai ga kyo no Tobu-sen ni ichitaizero de shori shita tame, hatsu no Nihon shirizu shinshutsu ga kettei shimashita (Because Rakudai won today's game against Tobu by 1-0, it is decided that Rakudai advances to the Japan Series for the first time)" corresponding to the headline, a headline "Darvi ga nohitto noran nogasu (Darvi let a no-hitter slip away)" and a piece of content (news body text) "Darvi wa kyukai tsuauto no jyokyo de yoban Maku ni hitto wo utare nohitto noran wo nogashimashita (Darvi allowed a hit to Mark, the fourth batter, with two outs in the ninth inning, and let a no-hitter slip away)" corresponding to the headline, and a headline "Rakudai no Nakata ga dairigu e iseki wo kibo (Nakata of Rakudai wants to move to Major League Baseball)" and apiece of content (news body text) "Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball)" corresponding to the headline.

The extractor 12 acquires the plurality of headlines and the pieces of content respectively corresponding to these headlines from the analyzer 11. The extractor 12 then extracts the reading of a word or the like which serves as a voice recognition object word candidate (which is hereinafter described as a "recognition object word candidate"), from each of the headlines acquired thereby.

The extractor 12 then brings each recognition object word candidate extracted thereby into correspondence with the headline from which the recognition object word candidate is extracted. At this time, although any method can be used as a method of extracting a recognition object word candidate, for example, each headline can be divided into words by performing a morphological analysis, and the reading of either a word at the head of the headline or a word string having a plurality of words starting with the word at the head and connected to one another (such either a word or a word string being described as a "word or the like" from here on) can be extracted as a recognition object word candidate.

Although the example, in which the word or the like at the head of each headline is extracted as a recognition object word candidate in the above-mentioned manner, is explained in this Embodiment 1, this is because persons typically utter the first word (character) in many cases.

Another extracting method, such as a method of extracting the reading of a word or the like having a high frequency of utterance by using the user's utterance history, can be alternatively used. The same goes for the following embodiments.

FIG. 6 is a table showing results of, in the extractor 12, extracting a recognition object word candidate from each of the headlines shown in FIG. 5, and bringing the recognition object word candidate into correspondence the headline.

As shown in this FIG. 6, the recognition object word candidates are extracted in which the recognition object word candidate of the headline "Rakudai Nihon shirizu hatsu shinshutsu (Rakudai advances to the Japan series for the first time)" is "Rakudai", the recognition object word candidate of the headline "Darvi ga nohitto noran nogasu (Darvi let a no-hitter slip away)" is "Darvi", and the recognition object word candidate of the headline "Rakudai no Nakata ga dairigu e iseki wo kibo (Nakata of Rakudai wants to move to Major League Baseball)" is "Rakudai."

The object word determiner 13 acquires, from the extractor 12, the plurality of headlines, the pieces of content respectively corresponding to these headlines, and the recognition object word candidates of the headlines. The object word determiner 13 determines whether recognition object word candidates overlapping each other exist in the acquired recognition object word candidates of the headlines, and also generates a recognition object word of each of the headlines dynamically in accordance with the recognition object word candidates.

In this Embodiment 1, when recognition object word candidates overlapping each other exist in the acquired recognition object word candidates of the headlines, the object word determiner 13 dynamically generates a recognition object word of each of the headlines in such a way that the recognition object words of the headlines differ from one another. More specifically, the object word determiner 13 causes the recognition object word candidates to differ from one another by processing or replacing at least one of recognition object word candidates overlapping each other to or with another word or the like.

Because the recognition object word candidate "Rakudai" of "Rakudai Nihon shirizu hatsu shinshutsu (Rakudai advances to the Japan series for the first time)" which is the first headline overlaps the recognition object word candidate "Rakudai" of "Rakudai no Nakata ga dairigu e iseki wo kibo (Nakata of Rakudai wants to move to Major League Baseball)" which is the third headline in the example shown in FIG. 6, the object word determiner 13 processes the recognition object word candidate of the first headline to "ichibanme no Rakudai (first Rakudai)" and also processes the recognition object word candidate of the third headline to "sanbanme no Rakudai (third Rakudai)", for example.

The object word determiner 13 then determines the recognition object word candidates after processing or replacement as voice recognition object words (hereinafter described as "recognition object words") respectively corresponding to the headlines.

In contrast, when recognition object word candidates overlapping each other do not exist, the object word determiner 13 determines the recognition object word candidates acquired from the extractor 12 as the recognition object words respectively corresponding to the headlines, just as they are.

The object word determiner 13 has a list of recognition words about operations other than the selection of headlines (e.g., a list of operating commands for operating a navigation device, other vehicle-mounted equipment and so on, etc.), and can process the recognition object word candidates in such a way that each of the recognition object words neither matches nor is similar to any word or the like included in the list, for example. More specifically, the object word determiner 13 can dynamically generate each of the recognition object words in such away that the recognition object word differs from any operating command for equipment.

Concretely, when, for example, there is a headline "Rakudai no eakon no ureyuki kocho (Air conditioners of Rakudai are selling well)" in addition to the headlines shown in FIG. 5, and "Rakudai" is extracted by the extractor 12 as the recognition abject word candidate, this recognition object word candidate overlaps other recognition object word candidates. Therefore, if "Rakudai" is replaced by "eakon (air conditioner)" as the recognition object word candidate, this recognition object word candidate matches an operating command "eakon (air conditioner)" for an air conditioner which is vehicle-mounted equipment. To solve this problem, the object word determiner 13 is configured so as not to perform such a process as the replacement.

The dictionary generator 14 generates a voice recognition dictionary 15 in which the recognition object words determined by the object word determiner 13 are defined as recognition words.

The voice recognizer 18 recognizes a voice collected by the microphone 5 with reference to the voice recognition dictionary 15, and outputs a recognition result character string. Because a known technique can be used as a voice recognition method which is used by the voice recognizer 18, the explanation of the voice recognition method will be omitted hereafter.

The controller 16 acquires the headlines, the recognition object words corresponding to these headlines, and the pieces of content similarly corresponding to the headlines from the object word determiner 13, and stores the headlines, the recognition object words and the pieces of content in the storage 17.

FIG. 7 is a table showing an example of the recognition object words of the headlines, the headlines, and the pieces of content (news body texts) respectively corresponding to the headlines, which are stored in the storage 17 in Embodiment 1.

This FIG. 7 shows a state in which the recognition object word candidate "Rakudai" of the first headline is processed to "ichibanme no Rakudai (first Rakudai)" by the object word determiner 13 and the recognition object word candidate "Rakudai" of the third headline is processed to "sanbanme no Rakudai (third Rakudai)" by the object word determiner 13, as mentioned above, and those readings determined as recognition object words are stored in the storage 17.

The controller 16 also issues a command to present the plurality of headlines acquired from the object word determiner 13 to the display or the like. Concretely, the controller 16 issues a command to display the headlines acquired from the object word determiner 13 to the display 3. As an alternative, after issuing a command to generate synthesized voices corresponding to the headlines to the voice synthesizer 19, the controller 16 issues a command to output the synthesized voices generated by the voice synthesizer 19 to the speaker 4.

As a method of issuing a command to present the headlines from the controller 16, a method of issuing a command to present the headlines by implementing at least one of display output and voice output can be used, or a method of issuing a command to present the headlines by implementing both display output and voice output can be used.

Further, because a known technique can be used as a voice synthesis method which is used by the voice synthesizer 19, the explanation of the voice synthesis method will be omitted hereafter.

In addition, the controller 16 uses, as a search key, the recognition result character string outputted by the voice recognizer 18, and searches through the storage 17. The controller 16 then selects the headline corresponding to the recognition object word matching the search key, and acquires the content corresponding to the headline. More specifically, when a voice recognition result acquired from a voice matches a recognition object word generated by the object word determiner 13, the controller 16 selects the headline from which the recognition object word matching the voice recognition result is determined, and acquires the content corresponding to the headline selected thereby.

After that, the controller 16 commands the display or the like to present the content acquired thereby. Also in this case, concretely, the controller 16 issues a command to display the acquired content to the display 3. As an alternative, the controller 16 issues a command to generate a synthesized voice by using the acquired content to the voice synthesizer 19, and also issues a command to output the synthesized voice generated by the voice synthesizer 19 to the speaker 4.

Also in this case, as a method of issuing a command to present the content from the controller 16, a method of issuing a command to present the content by implementing at least one of display output and voice output can be used, or a method of issuing a command to present the content by implementing both display output and voice output can be used.

Hereafter, a method of processing a recognition object word candidate and a method of replacing a recognition object word candidate, which are used by the object word determiner 13, will be explained in detail.

First, the method of processing a recognition object word candidate which is used by the object word determiner 13 will be explained.

When recognition object word candidates overlapping each other exist in the recognition object word candidates of the headlines which are acquired from the extractor 12, the object word determiner 13 processes at least one of the recognition object word candidates overlapping each other, and determines the recognition object word candidate after processing as a recognition object word corresponding to the headline, thereby generating the recognition object words of the headlines dynamically in such a way that the recognition object words differ from one another.

For example, the object word determiner 13 identifies the presentation positions or the positions in presentation order of the headlines respectively including the recognition object word candidate overlapping each other, and processes the recognition object word candidates in accordance with the presentation positions or the positions in the presentation order identified thereby. More specifically, the object word determiner 13 performs a process of adding a word or the like before each of the recognition object word candidates overlapping each other, the word or the like showing either the position or the position in output order at which the headline from which the overlapping recognition object word candidate is extracted is displayed on the display 3 or outputted via voice from the speaker 4.

Concretely, it is assumed that, for example, the headlines acquired by the analyzer 11 are "Rakudai Nihon shirizu shinshutsu (Rakudai advances to the Japan Series)", "Darvi ga nohitto noran nogasu (Darvi let a no-hitter slip away)", and "Rakudai no Nakata ga dairigu e iseki wo kibo (Nakata of Rakudai wants to move to Major League Baseball)", the recognition object word candidates extracted by the extractor 12 and respectively corresponding to the headlines are "Rakudai", "Darvi", and "Rakudai", and the headlines are displayed on the display 3, as shown in FIG. 2.

In this case, because the recognition object word candidates of the first and third headlines are all "Rakudai" and overlap each other, the object word determiner 13 processes the recognition object word candidate "Rakudai" corresponding to "Rakudai Nihon shirizu shinshutsu (Rakudai advances to the Japan Series)" which is the first headline to "ichibanme no Rakudai (first Rakudai)", and also processes the recognition object word candidate "Rakudai" of "Rakudai no Nakata ga dairigu e iseki wo kibo (Nakata of Rakudai wants to move to Major League Baseball)" which is the third headline to "sanbanme no Rakudai (third Rakudai)."

As another processing method, the object word determiner 13 can perform a process of adding a word or the like before each of the recognition object word candidates overlapping each other, the word or the like showing either a relative presentation position or a relative position in the presentation order (a relative display position or a relative position in voice output order) of the headline from which the overlapping recognition object word candidate is extracted.

Concretely, in the above-mentioned example, the object word determiner 13 processes the recognition object word candidate "Rakudai" corresponding to "Rakudai Nihon shirizu shinshutsu (Rakudai advances to the Japan Series)" which is the top (first) headline to "ichibanme no Rakudai (first Rakudai)" or "ue no Rakudai (upper Rakudai)", and also processes the recognition object word candidate "Rakudai" of "Rakudai no Nakata ga dairigu e iseki wo kibo (Nakata of Rakudai wants to move to Major League Baseball)" which is the last (the third, relatively the second) headline to "nibanme no Rakudai (second Rakudai)" or "shita no Rakudai (lower Rakudai)."

As another processing method, the object word determiner 13 can process the recognition object word candidates overlapping each other by adding another word or the like (a word or a word string) to each of the recognition object word candidates. For example, the object word determiner 13 can perform a process of adding words or the likes, in the headlines, adjacent to the recognition object word candidates overlapping each other to the recognition object word candidates, respectively. The adjacent words or the likes can be determined by using the results of analysis performed by the extractor 12.

Concretely, in the above-mentioned example, the object word determiner 13 adds, for example, an adjacent word string "Nihon shirizu (Japan series)" to the recognition object word candidate "Rakudai" corresponding to "Rakudai Nihon shirizu shinshutsu (Rakudai advances to the Japan Series)" which is the first headline, to process the recognition object word candidate to "Rakudai Nihon shirizu (Rakudai Japan Series)", and adds, for example, an adjacent word string "no Nakata (Nakata of)" to the recognition object word candidate "Rakudai" of "Rakudai no Nakata ga dairigu e iseki wo kibo (Nakata of Rakudai wants to move to Major League Baseball)" which is the third headline, to process the recognition object word candidate to "Rakudai no Nakata (Nakata of Rakudai)."

Although the example of processing each of recognition object word candidates overlapping each other is explained above, the object word determiner 13 can process only either of the recognition object word candidates. More specifically, the object word determiner 13 does not have to process all of recognition object word candidates overlapping each other, and is simply required to process at least one of the recognition object word candidates as long as the overlap with the other recognition object word candidate can be removed.

Next, the method of replacing a recognition object word candidate which is used by the object word determiner 13 will be explained.

When recognition object word candidates overlapping each other exist in the recognition object word candidates of the headlines which are acquired from the extractor 12, the object word determiner 13 replaces at least one of the recognition object word candidates overlapping each other with another word for replacement (another recognition object word candidate) and determines the recognition object word candidate after replacement as a recognition object word corresponding to the headline, thereby generating the recognition object words of the headlines dynamically in such a way that the recognition object words differ from one another.

For example, for at least one of the recognition object word candidate overlapping each other, the object word determiner 13 acquires, from the extractor 12, another recognition object word candidate which does not overlap any of the recognition object word candidates corresponding to the other headlines, and replaces the recognition object word candidate with the other recognition object word candidate acquired thereby. More specifically, the object word determiner 13 replaces one of the recognition object word candidates overlapping each other with another recognition object word candidate included in the headline including the one of the recognition object word candidates overlapping each other.

Concretely, because the recognition object word candidates of the first and third headlines are all "Rakudai" and overlap each other in the above-mentioned example, the object word determiner 13 acquires, from the extractor 12, "Nihon shirizu (Japan series)" which is another recognition object word candidate corresponding to "Rakudai Nihon shirizu shinshutsu (Rakudai advances to the Japan Series)" which is the first headline, and which does not overlap any of the recognition object word candidates corresponding to the other headlines, and replaces the recognition object word candidate with the other recognition object word candidate. More specifically, the object word determiner 13 selects, instead of the recognition object word candidate "Rakudai", "Nihon shirizu (Japan series)" as the recognition object word candidate, and determines this recognition object word candidate as a recognition object word.

Although because the object word determiner 13 can remove the overlap between the recognition object word candidates by simply replacing either of the recognition object word candidates in this way, the problem disappears, the object word determiner 13 can also acquire, from the extractor 12, for example, "Nakata" which is another recognition object word candidate corresponding to "Rakudai no Nakata ga dairigu e iseki wo kibo (Nakata of Rakudai wants to move to Major League Baseball)" which is the third headline, and which does not overlap any of the recognition object word candidates corresponding to the other headlines, and replace the recognition object word candidate with the other recognition object word candidate.

Further, as another replacing method, the object word determiner 13 can analyze each of headlines from which recognition object word candidates overlapping each other are extracted by using a known intention understanding technique, to identify a category to which each of the headlines belongs, and generate a new word or the like showing the category. The object word determiner 13 then determines, as a recognition object word, the generated word or the like by which one of the recognition object word candidates overlapping each other is replaced. More specifically, the object word determiner 13 analyzes the meaning of the headline including at least one of the recognition object word candidate overlapping each other, determines a term corresponding to the meaning as another recognition object word candidate, and replaces at least the one of the recognition object word candidates overlapping each other with the other recognition object word candidate.

Concretely, it is assumed in an example different from the above-mentioned example that, for example, the headlines acquired by the analyzer 11 are "Rakudai ka ra koraku shizun torai no oshirase (Information of the onset of season of outings from Rakudai)", "Darvi ga nohitto noran nogasu (Darvi let a no-hitter slip away)", and "Rakudai no Nakata ga dairigu e iseki wo kibo (Nakata of Rakudai wants to move to Major League Baseball)."

In this case, the recognition object word candidate of the first headline and that of the third headline are all "Rakudai" and overlap each other, and, using a known intention understanding technique, the category to which "Rakudai ka ra koraku shizun torai no oshirase (Information of the onset of season of outings from Rakudai)" which is the first headline belongs is identified as "ryoko (travel)" and the category to which "Rakudai no Nakata ga dairigu e iseki wo kibo (Nakata of Rakudai wants to move to Major League Baseball)" which is the third headline belongs is identified as "yakyu (baseball)."

For example, a word string "ryoko no hou (travel-related)" corresponding to the category "ryoko (travel)" and a word string "yakyu no hou (baseball-related)" corresponding to the category "yakyu (baseball)" are generated. The object word determiner 13 then replaces the recognition object word candidate "Rakudai" corresponding to the first headline "Rakudai ka ra koraku shizun torai no oshirase (Information of the onset of season of outings from Rakudai)" with the recognition object word candidate "ryoko no hou (travel-related)."

Also in this case, although because the object word determiner 13 can remove the overlap between the recognition object word candidates by simply replacing either of the recognition object word candidates, the problem disappears, the object word determiner 13 can also replace, for example, the recognition object word candidate "Rakudai" corresponding to "Rakudai no Nakata ga dairigu e iseki wo kibo (Nakata of Rakudai wants to move to Major League Baseball)" which is the third headline with the recognition object word candidate "yakyu no hou (baseball-related)."

The word or the like after replacement is not limited to one showing a category to which the corresponding headline belongs, and can be any word or the like as long as this word or the like shows the intention of the headline.

Figure 8:
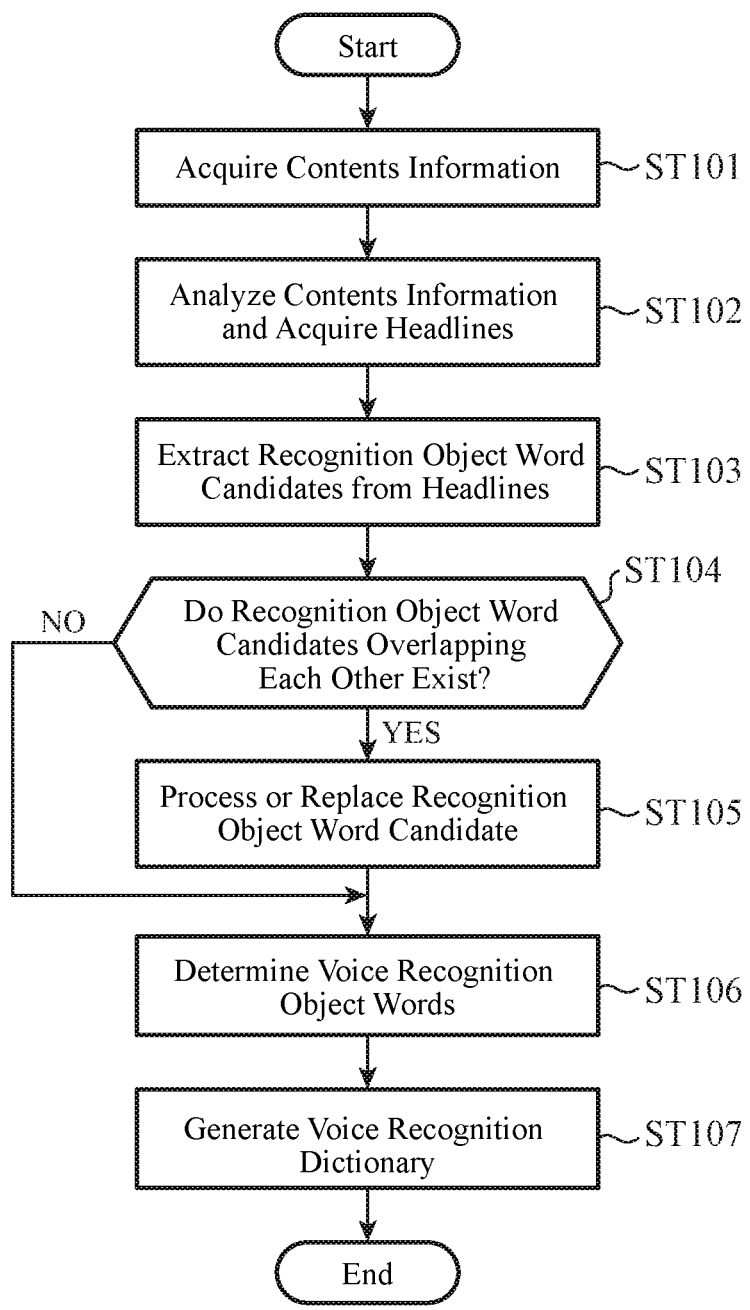
FIG. 8 is a flow chart showing operations including up to generation of a voice recognition dictionary in the information providing system according to Embodiment 1.
Figure 9:
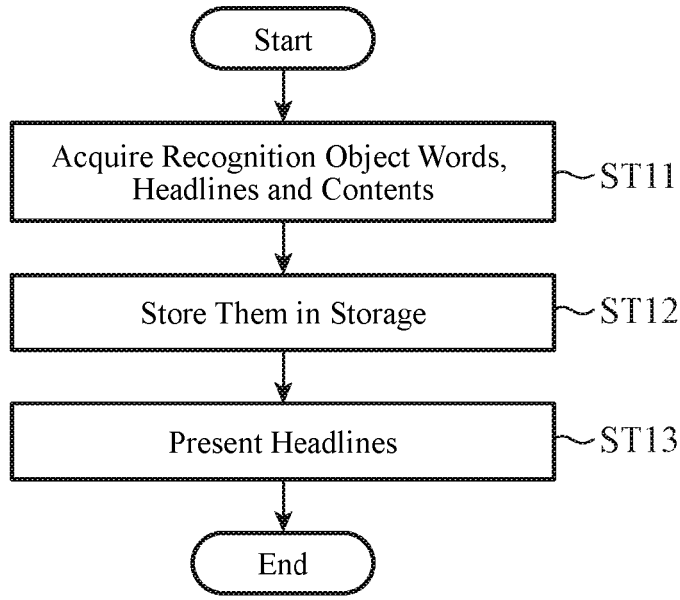
FIG. 9 is a flowchart showing an operation of outputting the headlines and an operation of storing pieces of content and so on in the storage in the information providing system according to Embodiment 1.
Figure 10:
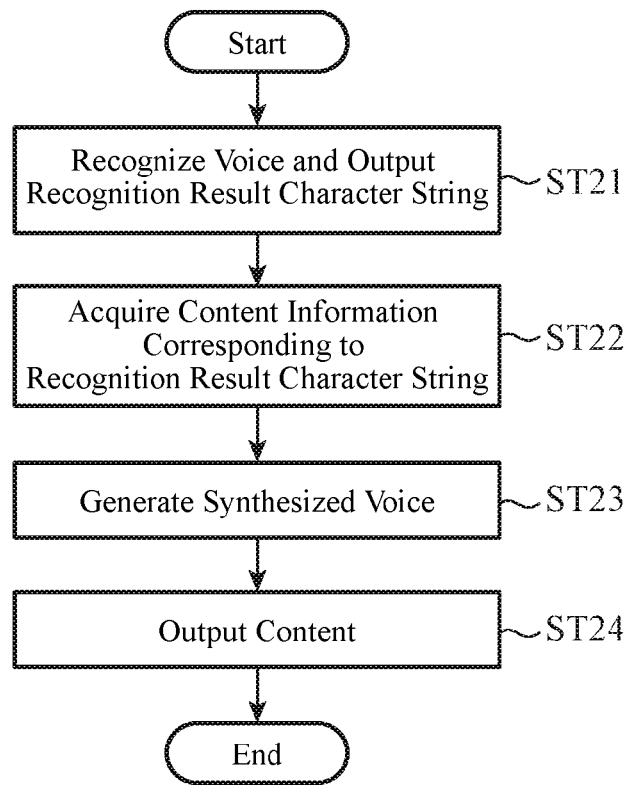
FIG. 10 is a flow chart showing an operation of presenting a piece of content in the information providing system according to Embodiment 1.

Next, the operations of the information providing system 1 according to this Embodiment 1 will be explained concretely with reference to flow charts shown in FIGS. 8 to 10. FIG. 8 is a flowchart showing operations including up to the operation of generating a voice recognition dictionary in the information providing system 1 according to Embodiment 1. FIG. 9 is a flow chart showing the operation of outputting headlines and the operation of storing pieces of content and so on in the storage 17 in the information providing system 1 according to Embodiment 1. FIG. 10 is a flow chart showing the operation of presenting a piece of content in the information providing system 1 according to Embodiment 1.

FIG. 11 is a diagram showing content information which the acquirer 10 acquires via the network 2. Hereafter, the explanation will be made on the assumption that texts described in an HTML form as shown in FIG. 11 are the target for the processing performed by the information providing system 1.

Further, it is assumed that the news body texts which are the pieces of content are described in "news1.html", "news2.html", and "news3.html", and their descriptions are "Rakudai ga kyo no Tobu-sen ni ichitaizero de shori shita tame, hatsu no Nihon shirizu shinshutsu ga kettei shimashita (Because Rakudai won today' s game against Tobu by 1-0, it is decided that Rakudai advances to the Japan Series for the first time)", "Darvi wa kyukai tsuauto no jyokyo de yoban Maku ni hitto wo utare nohitto noran wo nogashimashita (Darvi allowed a hit to Mark, the fourth batter, with two outs in the ninth inning, and let a no-hitter slip away)", and "Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball)", as shown in FIG. 5.

Further, the explanation will be made on the assumption that the information providing system 1 according to this Embodiment 1 displays the headlines on the display, and outputs via voice the content corresponding to a headline selected through the user's utterance. These operations are implemented by taking into consideration a situation, such as a situation in which the user is driving a vehicle, in which even if detailed news body texts are displayed on the display, the user cannot read their descriptions.

In a case in which the display has quite a large screen, or in a case in which the user is not in a situation in which the user has to concentrate on another thing, e.g., during the driving of a vehicle, the information providing system 1 can display the content corresponding to a headline selected through the user's utterance on the display. As an alternative, the information providing system 1 can present the content by implementing both display output and voice output.

First, the operation of generating a voice recognition dictionary will be explained using the flow chart shown in FIG. 8.

The acquirer 10 acquires content information via the network 2 first (in step ST01). Hereafter, it is assumed that the acquirer acquires content information as shown in FIG. 11 (news information which consists of text information).

Next, the analyzer 11 analyzes the descriptions of the content information acquired by the acquirer 10, and acquires pieces of content and the headlines of these pieces of content (in step ST02).

Concretely, the analyzer 11 analyzes the configuration of the content information (news information which consists of text information) acquired by the acquirer 10, and acquires "Rakudai Nihon shirizu hatsu shinshutsu (Rakudai advances to the Japan series for the first time)" as the headline of a piece of news (content) from "<A HREF="news1.html">Rakudai Nihon shirizu hatsu shinshutsu (Rakudai advances to the Japan series for the first time)</A>" specified by a </A> tag.

The analyzer 11 also acquires an HTML file specified by a "HREF" attribute via the acquirer 10, and acquires the news body text (content) described in this file. The analyzer 11 performs the process of acquiring a headline and a news body text (content) on all descriptions each specified by a <A> tag.

An example of the headlines and the pieces of content (news body texts) which are acquired by the analyzer 11 is as shown in FIG. 5.

Next, the extractor 12 extracts recognition object word candidates from all the headlines acquired by the analyzer 11 (in step ST03). Although as explained in the explanation about the above-mentioned extractor 12, any method can be used as the extracting method, the explanation will be made in this embodiment on the assumption that, for example, each headline is divided into words through a morphological analysis, and the reading of the word at the head is extracted as the recognition object word candidate corresponding to the headline.

As a result, "Rakudai" is extracted from the headline "Rakudai Nihon shirizu hatsu shinshutsu (Rakudai advances to the Japan series for the first time)" as the recognition object word candidate, "Darvi" is extracted from the headline "Darvi ga nohitto noran nogasu (Darvi let a no-hitter slip away)" as the recognition object word candidate, and "Rakudai" is extracted from the headline "Rakudai no Nakata ga dairigu e iseki wo kibo (Nakata of Rakudai wants to move to Major League Baseball)" as the recognition object word candidate.

The results of extracting the recognition object word candidates from the headlines in this way are as shown in FIG. 6.

The object word determiner 13 then determines whether recognition object word candidates overlapping each other exist in the recognition object word candidates extracted by the extractor 12 (in step ST04).

When recognition object word candidates overlapping each other exist (when "YES" in step ST04), the object word determiner 13 processes or replaces at least one of the recognition object word candidates overlapping each other by using one of the above-mentioned processing methods or one of the above-mentioned replacing methods (in step ST05), and determines the recognition object word candidate after processing or replacement as a voice recognition object word (in step ST06).

In contrast, when recognition object word candidates overlapping each other do not exist (when "NO" in step ST04), the object word determiner 13 determines the recognition object word candidates extracted by the extractor 12 as voice recognition object words, just as they are (in step ST06).

Because the recognition object word candidate "Rakudai" exists overlappedly in the above-mentioned example, by using, for example, the method, among the above-mentioned processing methods, of adding a word or the like before each of the recognition object word candidates overlapping each other, the word or the like showing either a relative display position or a relative position in the voice output order of the headline from which the overlapping recognition object word candidate is extracted, the object word determiner 13 processes the recognition object word candidate of the headline "Rakudai Nihon shirizu hatsu shinshutsu (Rakudai advances to the Japan series for the first time)" to "ichibanme no Rakudai (first Rakudai)" and also processes the recognition object word candidate of the headline "Rakudai no Nakata ga dairigu e iseki wo kibo (Nakata of Rakudai wants to move to Major League Baseball)" to "nibanme no Rakudai (second Rakudai)", and determines the processed results as recognition object words.

The dictionary generator 14 then generates a voice recognition dictionary 15 in which the recognition object words determined by the object word determiner 13 are defined as recognition words (in step ST07).

In this case, a voice recognition dictionary 15 in which "ichibanme no Rakudai (first Rakudai)", "Darvi", and "nibanme no Rakudai (second Rakudai)" are defined as recognition words is generated.

In the processing method for use when recognition object word candidates overlap each other, it is preferable to predetermine a rule to add a word showing either a relative display position or a relative position in the voice output order first. Further, in a case in which, for example, the rule to add a word showing either a relative display position or a relative position in the voice output order first is predetermined, it is preferable that, for example, "ichibanme no Rakudai desuka? nibanme no Rakudai desuka? (First Rakudai or second Rakudai?)" is announced. As a result, the user can be also notified that "ichibanme no Rakudai (first Rakudai)" and "nibanme no Rakudai (second Rakudai)" are recognition object word candidates.

Further, when recognition object word candidates overlap each other and each of them is replaced by another word for replacement or the like in this way, it is preferable to, in order to present which word is a recognition object word candidate to the user, for example, display the recognition object word candidates each of which is the word for replacement by changing their colors or highlighting the recognition object word candidates. Concretely, when the recognition object word candidate of the headline "Rakudai Nihon shirizu hatsu shinshutsu (Rakudai advances to the Japan series for the first time)" is replaced by "Nihon shirizu (Japan series)", and the recognition object word candidate of the headline "Rakudai no Nakata ga dairigu e iseki wo kibo (Nakata of Rakudai wants to move to Major League Baseball" is replaced by "Nakata", it is preferable to, for example, display the word string "Nihon shirizu (Japan series)" and the word "Nakata" in the headlines displayed on the display 3, as shown in FIG. 2, by changing their colors or highlighting the word string and the word.

Next, the operation of outputting the headlines and storing the pieces of content and so on in the storage 17 will be explained using the flow chart shown in FIG. 9.

First, the controller 16 acquires the recognition object words, the headlines and the pieces of content from the object word determiner 13 (in step ST11), and stores the recognition object words, the headlines and the pieces of content in the storage 17 (in step ST12).

The recognition object words respectively corresponding to the headlines, the headlines, and the pieces of content (news body texts) respectively corresponding to the headlines, which are stored in the storage 17 in this way, are as shown in FIG. 7.

Next, the controller 16 issues a command to display (present) the headlines acquired from the object word determiner 13 to the display 3 (in step ST13).

As a result, as shown in FIG. 2, the headlines are displayed on the display 3.

Although the explanation will be made hereafter on the assumption that when presenting the headlines, these headlines are presented via display, the headlines can be alternatively presented via voice output or can be presented both via display and via voice output.

Finally, the operation of outputting a piece of content will be explained using the flow chart shown in FIG. 10.

First, the voice recognizer 18 recognizes a voice acquired by the microphone 5, and outputs a recognition result character string to the controller 16 (in step ST21).

For example, when "ichibanme no Rakudai (first Rakudai)" is uttered by the user, the voice recognizer 18 performs a recognition process with reference to the voice recognition dictionary 15, and outputs a character string "ichibanme no Rakudai (first Rakudai)" as a recognition result.

Next, the controller 16 acquires the recognition result character string outputted by the voice recognizer 18, and acquires the content information corresponding to the recognition result character string acquired thereby (in step ST22). More specifically, the controller 16 searches through the storage 17 by using the acquired recognition result character string as a search key. The controller 16 then selects the headline corresponding to the recognition object word matching the search key, and acquires the content corresponding to this headline.

Concretely, the controller 16 acquires, from the storage 17, "Rakudai ga kyo no Tobu-sen ni ichitaizero de shori shita tame, hatsu no Nihon shirizu shinshutsu ga kettei shimashita (Because Rakudai won today's game against Tobu by 1-0, it is decided that Rakudai advances to the Japan Series for the first time)" which is the character string of the content (news body text) corresponding to the recognition result character string "ichibanme no Rakudai (first Rakudai)" outputted by the voice recognizer 18.

After that, the controller 16 issues a command to generate a synthesized voice by using the character string of the acquired content (news body text) to the voice synthesizer 19 (in step ST23), acquires the synthesized voice generated by the voice synthesizer 19, and issues a command to output (present) the content (news body text) by using the synthesized voice to the speaker 4 (in step ST24).

As a result, the synthesized voice "Rakudai ga kyo no Tobu-sen ni ichitaizero de shori shita tame, hatsu no Nihon shirizu shinshutsu ga kettei shimashita (Because Rakudai won today's game against Tobu by 1-0, it is decided that Rakudai advances to the Japan Series for the first time)" is outputted from the speaker 4.

Although the explanation is made above on the assumption that the character string of the content (news body text) corresponding to the headline selected by the user is outputted via voice, as mentioned above, the controller 16 can alternatively display the character string of the acquired content (news body text) on the display 3 in accordance with the content information acquired in step ST22. As an alternative, the controller 16 presents the content both via display and via voice output.

As mentioned above, because the information providing system 1, which presents a plurality of headlines, selects one headline from these plurality of headlines, and presents information (content) corresponding to the headline selected thereby, is configured so as to perform processing or the like to determine recognition object words for selecting a headline in such a way that the recognition object words do not overlap one another, the user is enabled to select a headline uniquely by making an utterance and acquire information (content) corresponding to the headline selected.

Although the explanation is made in this Embodiment 1 on the assumption that the reading of the word at the head of each headline is extracted as the recognition object word candidate corresponding to the headline, and, when recognition object word candidates overlapping each other exist, processing or the like is performed on these recognition object word candidates in such a way that the recognition object word candidates do not overlap each other, this is because persons typically utter the first word (character) in many cases. Because recognition object word candidates overlap each other when the first words (characters) of headlines are the same, the information providing system determines the recognition object words in such a way that the recognition object words do not overlap one another by performing addition, connection, rephrasing, replacement, or the like of characters.

As mentioned above, because the information providing system according to Embodiment 1 determines recognition object words for selecting one headline from a plurality of headlines in such a way that the recognition object words do not overlap one another, the information providing system can select a headline uniquely through the user's utterance, and present information (content) corresponding to the headline selected thereby, and therefore the convenience to the user is improved.

Embodiment 2

In Embodiment 1, when there is an overlap among recognition object word candidates for selecting a headline, processing or the like is performed in advance on each of recognition object word candidates overlapping each other in such a way that the recognition object word candidates differ from each other, and the processed recognition object word candidates are determined as new recognition object words for selecting a headline, so that the overlapping recognition object word candidates are treated as not recognition object words. Therefore, when a user utters the recognition object word candidate existing overlappedly, the utterance is misrecognized.

Concretely, in Embodiment 1, because the recognition object word candidate "Rakudai" exists overlappedly, the recognition object word of the first headline is processed to "ichibanme no Rakudai (first Rakudai)" and the recognition object word of the third headline is processed to "sanbanme no Rakudai (third Rakudai)", for example, as shown in FIG. 7. In this case, because even if the user utters "Rakudai", this character string is not included in the voice recognition dictionary 15, the operation is ended while the utterance cannot be recognized.

To solve this problem, when a user utters a recognition object word existing in a plurality of headlines, an information providing system 20 according to Embodiment 2 of the present invention displays headlines each including this recognition object word and the other headlines first in such a way that the display mode of the headlines each including the recognition object word differs from that of the other headlines, to clearly notify the user that all the headlines are narrowed down to the headlines each including the recognition object word. As a result, the user can be notified that the recognition object word exists overlappedly.

When a recognition object word included in one of the headlines after narrowing-down and not overlapping any other recognition object word among the headlines is then uttered by the user, the information providing system 20 selects the headline including the recognition object word uttered by the user. After that, the information providing system 20 issues a command to present the content corresponding to the selected headline via display or voice output to a display or the like.

For example, when the user utters "Rakudai" in a situation in which three headlines: "Rakudai Nihon shirizu hatsu shinshutsu (Rakudai advances to the Japan series for the first time)", "Darvi ga nohitto noran nogasu (Darvi let a no-hitter slip away)", and "Rakudai no Nakata ga dairigu e iseki wo kibo (Nakata of Rakudai wants to move to Major League Baseball)" are displayed on the display 3 as the headlines of pieces of news, as shown in FIG. 2, the information providing system 20 issues a command to gray out the headline "Darvi ga nohitto noran nogasu (Darvi let a no-hitter slip away)" not including "Rakudai" to the display 3.

Figure 12:
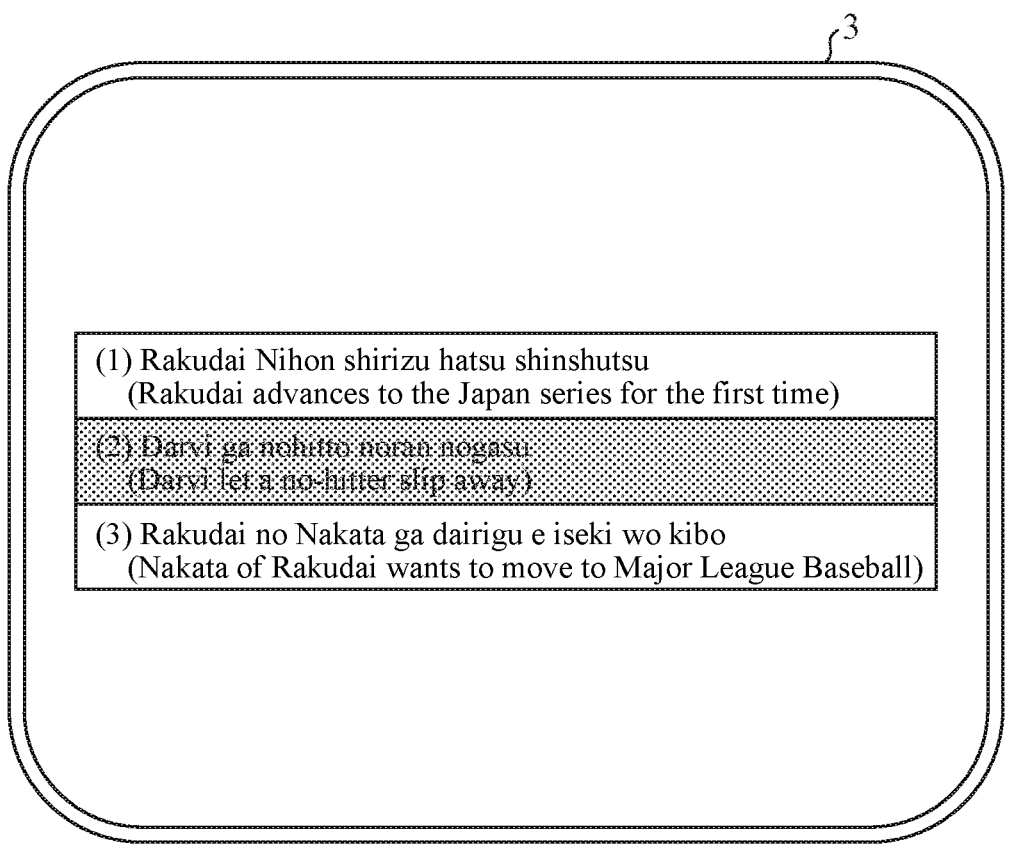
FIG. 12 is a diagram showing an example of a display screen which is displayed on a display by an information providing system according to Embodiment 2 in a state in which the headlines of pieces of news are narrowed down.

As a result, as shown in FIG. 12, the second headline "Darvi ga nohitto noran nogasu (Darvi let a no-hitter slip away)" is grayed out and becomes hard to view, and the remaining two headlines including the first headline "Rakudai Nihon shirizu hatsu shinshutsu (Rakudai advances to the Japan series for the first time)" and the third headline "Rakudai no Nakata ga dairigu e iseki wo kibo (Nakata of Rakudai wants to move to Major League Baseball)" are displayed in a bright legible state, just as they are, so that it is clearly notified that the headlines are narrowed down to these two headlines.

FIG. 12 is a diagram showing an example of a display screen which is displayed on the display by the information providing system 20 according to this Embodiment 2 in a state in which the headlines of the pieces of news are narrowed down.

When the user then utters "Nakata" in this state, the news body text corresponding to the headline "Rakudai no Nakata ga dairigu e iseki wo kibo (Nakata of Rakudai wants to move to Major League Baseball)" is outputted via voice from a speaker 4 or displayed on the display 3.

Figure 13:
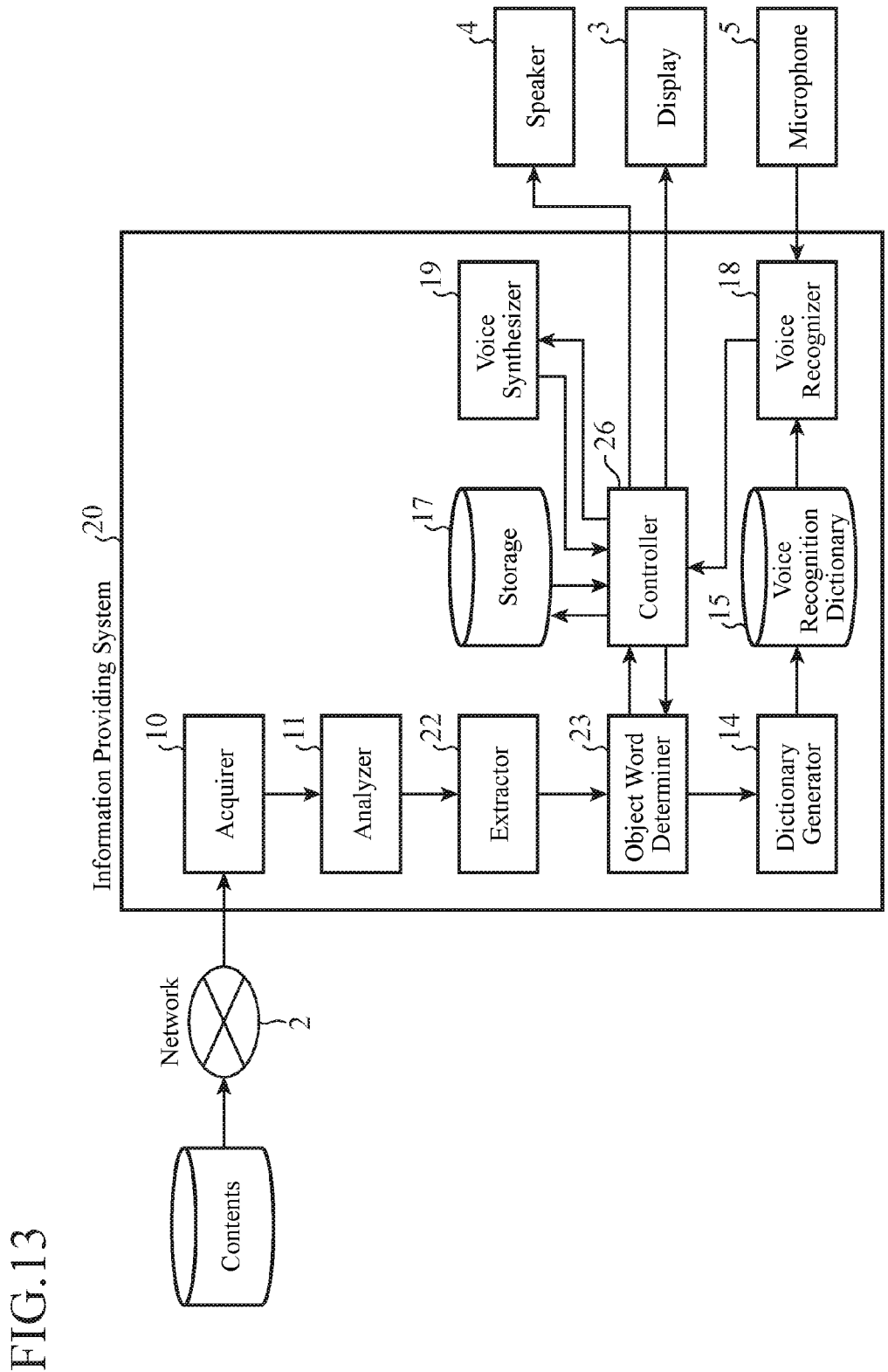
FIG. 13 is a block diagram showing an example of the information providing system according to Embodiment 2.

FIG. 13 is a block diagram showing an example of the information providing system 20 according to Embodiment 2 of the present invention. The same components as those explained in Embodiment 1 are denoted by the same reference numerals, and the duplicated explanation of the components will be omitted hereafter.

In this Embodiment 2, an extractor 22 extracts a plurality of recognition object word candidates for each of headlines acquired from an analyzer 11.

FIG. 14 is a table showing results of, in the extractor 22, extracting a plurality of recognition object word candidates from each of the headlines shown in FIG. 5, and bringing these plurality of recognition object word candidates into correspondence the headline.

Here, both "Rakudai", as a first recognition object word candidate, and "Nihon shirizu (Japan series)", as a second recognition object word candidate, are brought into correspondence with the headline "Rakudai Nihon shirizu hatsu shinshutsu (Rakudai advances to the Japan series for the first time)." Further, both "Darvi", as a first recognition object word candidate, and "nohitto (no-hitter)", as a second recognition object word candidate, are brought into correspondence with the headline "Darvi ga nohitto noran nogasu (Darvi let a no-hitter slip away)." Further, both "Rakudai", as a first recognition object word candidate, and "Nakata", as a second recognition object word candidate, are brought into correspondence with the headline "Rakudai no Nakata ga dairigu e iseki wo kibo (Nakata of Rakudai wants to move to Major League Baseball)."

Here, although the example in which a word or the like included in each headline is determined as a second recognition object word candidate is explained, a word or the like showing a position or a position in order of each headline can be alternatively determined as a recognition object word candidate. For example, the second recognition object word candidate of the first headline "Rakudai Nihon shirizu hatsu shinshutsu (Rakudai advances to the Japan series for the first time)" is determined to be "ichibanme (first)", "hitotsume (first)", "ue no hou (upper)", or the like, and the second recognition object word candidate of the third headline "Rakudai no Nakata ga dairigu e iseki wo kibo (Nakata of Rakudai wants to move to Major League Baseball)" is determined to be "sanbanme (third)", "futatsume (second)", "shita no hou (lower)", or the like.

Further, as explained also in Embodiment 1, in an example different from the above-mentioned example, in which, for example, the headlines acquired by the analyzer 11 are "Rakudai ka ra koraku shizun torai no oshirase (Information of the onset of season of outings from Rakudai)", "Darvi ga nohitto noran nogasu (Darvi let a no-hitter slip away)", and "Rakudai no Nakata ga dairigu e iseki wo kibo (Nakata of Rakudai wants to move to Major League Baseball)", "ryoko no hou (travel-related)" corresponding to a category "ryoko (travel)" to which "Rakudai ka ra koraku shizun torai no oshirase (Information of the onset of season of outings from Rakudai)" which is the first headline belongs can be determined as the second recognition object word candidate corresponding to this headline, and "yakyu no hou (baseball-related)" corresponding to a category "yakyu (baseball)" to which "Rakudai no Nakata ga dairigu e iseki wo kibo (Nakata of Rakudai wants to move to Major League Baseball)" which is the third headline belongs can be determined as the second recognition object word candidate corresponding to this headline.

The word or the like determined as the second recognition object word candidate is not limited to one showing a category to which the corresponding headline belongs, and can be any word or the like as long as this word or the like shows the intention of the headline.

In addition, all recognition object words that are likely to be candidates can be extracted as recognition object word candidates, such as a third candidate, a fourth candidate, and . . . .

For the sake of simplicity, although the following explanation will be made on the assumption that the number of recognition object word candidates which the extractor 22 extracts for each headline is two, this embodiment is limited to this example.

An object word determiner 23 acquires the plurality of headlines, the pieces of content respectively corresponding to these headlines, and the recognition object word candidates of each of the headlines from the extractor 12. The object word determiner 23 then generates a recognition object word of each of the headlines dynamically in accordance with the acquired recognition object word candidates of each of the headlines.

In this Embodiment 2, before dynamically generating the recognition object word of each of the headlines in such a way that the recognition object words of the headlines differ from one another, the object word determiner 23 determines the first recognition object word candidates acquired thereby as the recognition object words first, regardless of whether recognition object word candidates overlapping each other exist in the recognition object word candidates of the headlines acquired from the extractor 22.

Further, when receiving a command to re-determine (re-generate) recognition object words corresponding headlines specified (headlines selected) by a controller 26 from the controller 26, the object word determiner 23 determines the second recognition object word candidate brought into correspondence with at least one of the headlines, as a new recognition object word. More specifically, the object word determiner 23 dynamically re-generates the recognition object word of each of the headlines in such a way that the recognition object words of the headlines differ from one another.

The object word determiner 23 has a list of recognition words about operations other than the selection of headlines (e.g., a list of operating commands for operating a navigation device, other vehicle-mounted equipment and so on, etc.), and can determine new recognition object words in such a way that each of the recognition object words neither matches nor is similar to any word or the like included in the list.

Concretely, when, for example, there is a headline "Rakudai no eakon no ureyuki kocho (Air conditioners of Rakudai are selling well)" in addition to the headlines shown in FIG. 5, and "Rakudai" is extracted by the extractor 22 as the first recognition object word candidate and "eakon (air conditioner)" is extracted by the extractor as the second recognition object word candidate, if the object word determiner 23 determines "eakon (air conditioner)" as the recognition object word of this headline, this recognition object word candidate matches an operating command "eakon (air conditioner)" for an air conditioner which is vehicle-mounted equipment. To solve this problem, the object word determiner 23 is configured so as not to determine such a recognition object word candidate as a new recognition object word.

A dictionary generator 14 generates a voice recognition dictionary 15 in which the recognition object words determined by the object word determiner 23 are defined as recognition words.

The controller 26 acquires the headlines, the recognition object words respectively corresponding to these headlines, and the plural pieces of content respectively and similarly corresponding to the headlines from the object word determiner 23, and stores the headlines, the recognition object words and the plural pieces of content in a storage 17.

FIG. 15 is a table showing an example of the recognition object words of the headlines, the headlines, and the pieces of content (news body texts) respectively corresponding to the headlines, which are stored in the storage 17 in Embodiment 2.

This FIG. 15 shows a state in which the first recognition object word candidates of the headlines are determined first as the recognition object words by the object word determiner 23, as mentioned above, and are then outputted to the controller 26 and stored in the storage 17. More specifically, the recognition object word of the headline "Rakudai Nihon shirizu hatsu shinshutsu (Rakudai advances to the Japan series for the first time)" is "Rakudai", the recognition object word of the headline "Darvi ga nohitto noran nogasu (Darvi let a no-hitter slip away)" is "Darvi", and the recognition object word of the headline "Rakudai no Nakata ga dairigu e iseki wo kibo (Nakata of Rakudai wants to move to Major League Baseball)" is "Rakudai."

Further, the controller 26 issues a command to present the headlines acquired from the object word determiner 23 to the display or the like. Concretely, the controller 26 issues a command to display the headlines acquired from the object word determiner 23 to the display 3. As an alternative, after issuing a command to generate synthesized voices corresponding to the headlines to a voice synthesizer 19, the controller 26 issues a command to output the synthesized voices generated by the voice synthesizer 19 to the speaker 4.

As a method of issuing a command to present the headlines from the controller 26, a method of issuing a command to present the headlines by implementing at least one of display output and voice output can be used, or a method of issuing a command to present the headlines by implementing both display output and voice output can be used.

Further, because a known technique can be used as a voice synthesis method which is used by the voice synthesizer 19, the explanation of the voice synthesis method will be omitted hereafter.

In addition, the controller 26 uses, as a search key, a recognition result character string outputted by a voice recognizer 18, and searches through the storage 17. When a plurality of recognition object words match the search key, the controller 26 issues a command to re-determine the recognition object word for each of the headlines respectively corresponding to the recognition object words matching the search key to the object word determiner 23. More specifically, when a voice recognition result acquired from a voice matches a plurality of recognition object words generated by the object word determiner 23, the controller 26 narrows down the headlines to two or more headlines from which the recognition object words the same as each other are determined, and commands the object word determiner 23 to re-generate, as the recognition object word, another recognition object word candidate (second recognition object word candidate) different from the recognition object word candidates (first recognition object word candidates) overlapping each other for each of the headlines after narrowing-down.

Concretely, when the user utters "Rakudai", "Rakudai" is outputted by the voice recognizer 18 as the recognition result character string, and, when a search is made through the storage 17 by using this "Rakudai" as the search key, more specifically, when a search is made through the table shown in FIG. 15 by using "Rakudai" as the search key, because the recognition object word of the first headline matches the recognition object word of the third headline, the controller 26 issues a command to re-determine the recognition object words to the object word determiner 23.

As a result, the recognition object words are re-determined by the object word determiner 23. For example, the recognition object word of the headline "Rakudai Nihon shirizu hatsu shinshutsu (Rakudai advances to the Japan series for the first time)" is re-determined to be "Nihon shirizu (Japan series)" which is the second candidate, the recognition object word of the headline "Darvi ga nohitto noran nogasu (Darvi let a no-hitter slip away)" is kept to be "Darvi", and the recognition object word of the headline "Rakudai no Nakata ga dairigu e iseki wo kibo (Nakata of Rakudai wants to move to Major League Baseball)" is re-determined to be "Nakata" which is the second candidate, and the recognition object words are outputted to the controller 26 and the dictionary generator 14.

Then, the dictionary generator 14 generates again the voice recognition dictionary 15 in which the recognition object words determined by the object word determiner 23 are defined as recognition words.

Further, the controller 26 acquires the recognition object words re-determined by the object word determiner 23, and updates the recognition object words of the headlines stored in the storage 17 to the re-determined recognition object words.

FIG. 16 is a table showing an example of the recognition object words of the headlines, the headlines, and the pieces of content (news body texts) respectively corresponding to the headlines, which are stored in the storage 17 in Embodiment 2 after the recognition object words are re-determined.

The controller 26 further issues a command to display the headlines corresponding to the recognition object words matching the search key and the other headlines in different display modes to the display 3.

As a result, a display screen, as shown in FIG. 12, in which the headlines of the pieces of news are narrowed down is displayed on the display 3.

Further, after searching through the storage 17 by using, as the search key, the recognition result character string outputted by the voice recognizer 18 and then finding that the number of recognition object words matching the search key is one (no plurality of recognition object words matching the search key exist), the controller 26 selects the headline corresponding to the recognition object word matching the search key, and acquires the content corresponding to the headline. More specifically, when a voice recognition result acquired from a voice matches only a recognition object word generated by the object word determiner 23, the controller 26 selects the headline from which the recognition object word matching the voice recognition result is determined, and acquires the content corresponding to the selected headline.

After that, the controller 26 issue a command to present the content acquired thereby to the display or the like. Concretely, the controller 26 issues a command to display the acquired content to the display 3. As an alternative, the controller 26 issues a command to generate a synthesized voice by using the acquired content to the voice synthesizer 19, and also issues a command to output the synthesized voice generated by the voice synthesizer 19 to the speaker 4.

Also in this case, as a method of issuing a command to present the content from the controller 26, a method of issuing a command to present the content by implementing at least one of display output and voice output can be used, or a method of issuing a command to present the content by implementing both display output and voice output can be used.

Figure 17:
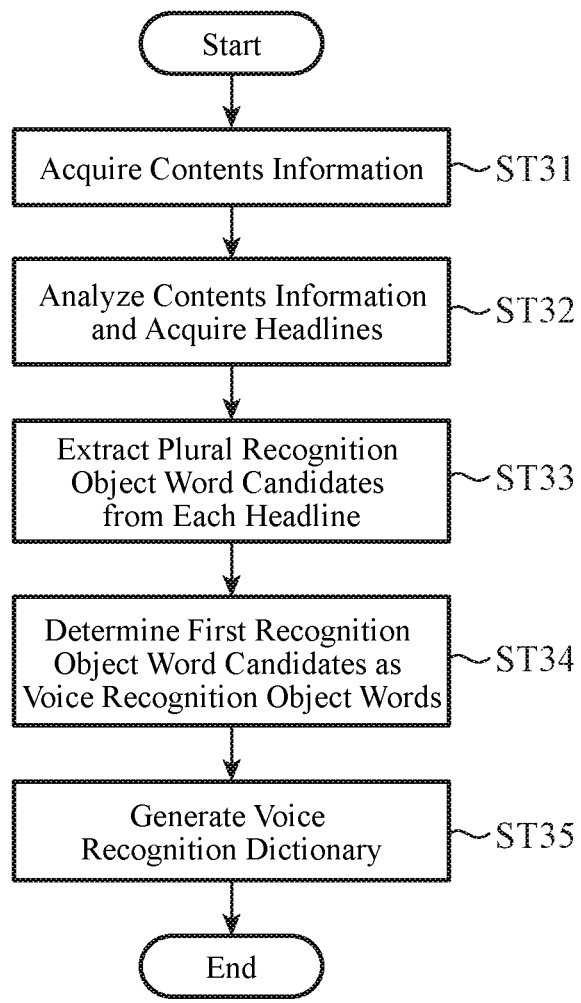
FIG. 17 is a flow chart showing operations including up to generation of a voice recognition dictionary in the information providing system according to Embodiment 2.
Figure 18:
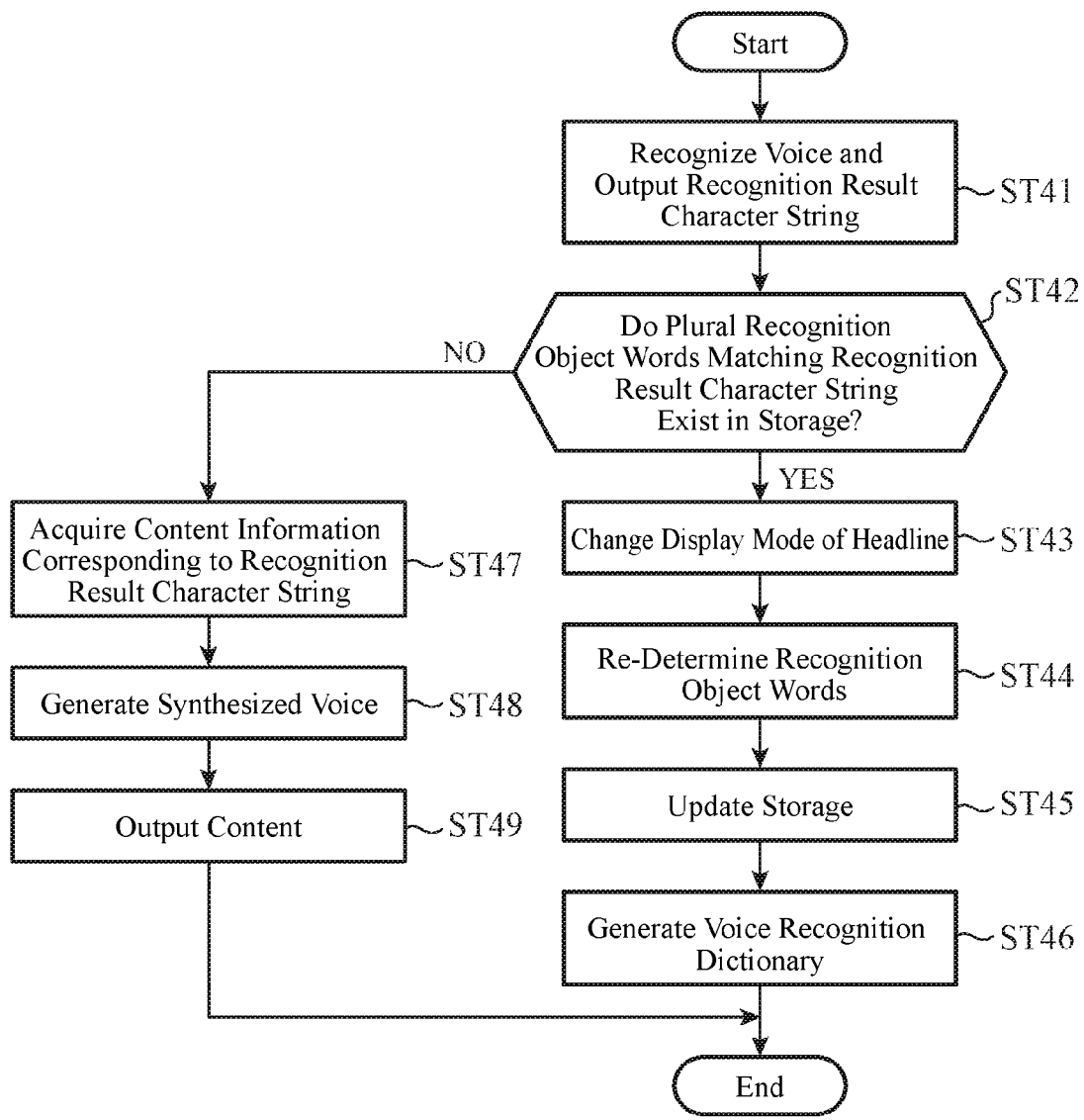
FIG. 18 is a flow chart showing an operation of storing the pieces of content and so on in the storage, an operation of updating the pieces of content, and an operation of presenting a piece of content in the information providing system according to Embodiment 2.

Next, the operations of the information providing system 20 according to this Embodiment 2 will be explained concretely with reference to flow charts shown in FIGS. 17 and 18. FIG. 17 is a flow chart showing operations including up to the operation of generating a voice recognition dictionary in the information providing system 20 according to Embodiment 2. FIG. 18 is a flow chart showing the operation of storing and updating pieces of content and so on in the storage 17 and the operation of presenting a piece of content in the information providing system 20 according to Embodiment 2.

Also in this Embodiment 2, the explanation will be made on the assumption that texts described in an HTML form as shown in FIG. 11 are the target for the processing performed by the information providing system 20.

Further, it is assumed that the news body texts which are the pieces of content are described in "news1.html", "news2.html", and "news3.html", and their descriptions are "Rakudai ga kyo no Tobu-sen ni ichitaizero de shori shita tame, hatsu no Nihon shirizu shinshutsu ga kettei shimashita (Because Rakudai won today's game against Tobu by 1-0, it is decided that Rakudai advances to the Japan Series for the first time)", "Darvi wa kyukai tsuauto no jyokyo de yoban Maku ni hitto wo utare nohitto noran wo nogashimashita (Darvi allowed a hit to Mark, the fourth batter, with two outs in the ninth inning, and let a no-hitter slip away)", and "Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball)", as shown in FIG. 5.

The explanation will be made by further assuming that the information providing system 20 according to this Embodiment 2 displays the headlines on the display, and outputs via voice the content corresponding to a headline selected through the user's utterance. These operations are implemented by taking into consideration a situation, such as a situation in which the user is driving a vehicle, in which even if detailed news body texts are displayed on the display, the user cannot read their descriptions.

When the display has quite a big screen, or when the user is not in a situation, such as a situation in which the user is driving a vehicle, in which the user has to concentrate on another thing, the information providing system 20 can display the content corresponding to a headline selected through the user's utterance on the display. As an alternative, the information providing system 20 can present the content by implementing both display output and voice output.

First, the operation of generating a voice recognition dictionary will be explained using the flow chart shown in FIG. 17.

An acquirer 10 acquires content information via a network 2 first (in step ST31). Hereafter, it is assumed that the acquirer acquires content information as shown in FIG. 11 (news information which consists of text information).

Next, the analyzer 11 analyzes the descriptions of the content information acquired by the acquirer 10, and acquires the pieces of content and the headlines of these pieces of content (in step ST32).

Concretely, the analyzer 11 analyzes the configuration of the content information (news information which consists of text information) acquired by the acquirer 10, and acquires "Rakudai Nihon shirizu hatsu shinshutsu (Rakudai advances to the Japan series for the first time)" as the headline of a piece of news (content) from "<A HREF="news1.html">Rakudai Nihon shirizu hatsu shinshutsu (Rakudai advances to the Japan series for the first time)</A>" specified by a </A> tag.

The analyzer 11 also acquires an HTML file specified by a "HREF" attribute via the acquirer 10, and acquires the news body text (content) described in this file. The analyzer 11 performs the process of acquiring a headline and a news body text (content) on all descriptions each specified by a <A> tag.

An example of the headlines and the pieces of content (news body texts) which are acquired by the analyzer 11 is as shown in FIG. 5.

Next, the extractor 22 extracts a plurality of recognition object word candidates from every of the headlines acquired by the analyzer 11 (in step ST33).

As a result, as shown in FIG. 14, "Rakudai" and "Nihon shirizu (Japan series)" are extracted as the recognition object word candidates from the headline "Rakudai Nihon shirizu hatsu shinshutsu (Rakudai advances to the Japan series for the first time)", "Darvi" and "nohitto (no-hitter)" are extracted as the recognition object word candidates from the headline "Darvi ga nohitto noran nogasu (Darvi let a no-hitter slip away)", and "Rakudai" and "Nakata" are extracted as the recognition object word candidates from the headline "Rakudai no Nakata ga dairigu e iseki wo kibo (Nakata of Rakudai wants to move to Major League Baseball)."

Next, the object word determiner 23 acquires the plurality of recognition object word candidates extracted by the extractor 22, the headlines and the pieces of contents, and determines, as voice recognition object words, the first candidates among the recognition object word candidates acquired from the extractor 22, regardless of whether or not there is an overlap among the recognition object word candidates (in step ST34).

As a result, as shown in FIG. 15, "Rakudai" is determined as the recognition object word corresponding to the headline "Rakudai Nihon shirizu hatsu shinshutsu (Rakudai advances to the Japan series for the first time)", "Darvi" is determined as the recognition object word corresponding to the headline "Darvi ga nohitto noran nogasu (Darvi let a no-hitter slip away)", and "Rakudai" is determined as the recognition object word corresponding to the headline "Rakudai no Nakata ga dairigu e iseki wo kibo (Nakata of Rakudai wants to move to Major League Baseball)."

After that, the dictionary generator 14 generates a voice recognition dictionary 15 in which the recognition object words determined by the object word determiner 23 are defined as recognition words (in step ST35).

In this case, a voice recognition dictionary 15 in which "Rakudai" and "Darvi" are defined as recognition words is generated.

Because the operation of outputting the headlines and the operation of storing the pieces of content and so on in the storage 17 are the same as those shown in the flow chart shown in FIG. 9 in Embodiment 1, the explanation of the operations will be omitted hereafter.

As a result of performing the processing in accordance with the flow chart shown in FIG. 9, the recognition object words respectively corresponding to the headlines, the headlines, and the pieces of content (news body texts) respectively corresponding to the headlines are stored in the storage 17, as shown in FIG. 5.

Finally, the operation of storing and updating the pieces of content and so on in the storage 17 and the operation of outputting a piece of content will be explained by using the flow chart shown in FIG. 18.

First, the voice recognizer 18 recognizes a voice acquired by the microphone 5, and outputs a recognition result character string to the controller 26 (in step ST41).

For example, when the user utters "Rakudai", the voice recognizer 18 performs a recognition process with reference to the voice recognition dictionary 15, and outputs a character string "Rakudai" as a recognition result.

Next, the controller 26 acquires the recognition result character string outputted by the voice recognizer 18, and determines whether a plurality of recognition object words matching the recognition result character string acquired thereby exist in the storage 17 (in step ST42). More specifically, the controller searches through the storage 17 by using the recognition result character string acquired thereby as the search key.

When a plurality of recognition object words matching the search key exist (when "YES" in step ST42), the controller 26 issues a command to display the headline corresponding to each of the recognition object words and the other headlines in different display modes to the display 3 (in step ST43).

As a result, the headlines are displayed on the display 3 as shown in FIG. 12.

Next, the controller 26 issues a command to re-determine the recognition object word for the headline corresponding to each of the recognition object words matching the search key to the object word determiner 23. The object word determiner 23 newly determines, as the recognition object word, the second candidate among the plurality of recognition object word candidates brought into correspondence with each of the headlines, in response to the command from the controller 26 (in step ST44).

As a result, as shown in FIG. 16, "Nihon shirizu (Japan series)" is re-determined as the recognition object word corresponding to the headline "Rakudai Nihon shirizu hatsu shinshutsu (Rakudai advances to the Japan series for the first time)", and "Nakata" is re-determined as the recognition object word corresponding to the headline "Rakudai no Nakata ga dairigu e iseki wo kibo (Nakata of Rakudai wants to move to Major League Baseball)."

The controller 26 then acquires the recognition object words re-determined by the object word determiner 23, and updates the recognition object words stored in the storage 17 and corresponding to the headlines to the re-determined recognition object words (in step ST45).

As a result, the descriptions of the information stored in the storage 17 are updated from those shown in in FIG. 15 to those shown in FIG. 16.

After that, the dictionary generator 14 generates a voice recognition dictionary 15 in which the recognition object words determined by the object word determiner 23 are defined as recognition words (in step ST46), and ends the processing.

As a result, a voice recognition dictionary 15 in which "Nihon shirizu (Japan series)", "Darvi" and "Nakata" are defined as recognition words is generated.

Also in this case, by, for example, displaying the word string "Nihon shirizu (Japan series)" and the word "Nakata" in the headlines displayed on the display 3, as shown in FIG. 12, by changing their colors or highlighting the word string and the word, the user can be notified that the recognition object word of the first headline is "Nihon shirizu (Japan series)" and the recognition object word of the third headline is "Nakata."

In contrast, when no plurality of recognition object words matching the search key exist (when "NO" in step ST42), the controller 26 selects the headline corresponding to the recognition object word matching the search key, and acquires the content corresponding to the headline. More specifically, the controller 26 acquires the content information corresponding to the recognition result character string outputted by the voice recognizer 18 (step ST47).

Concretely, assuming that, for example, "Nakata" is uttered by the user after the process of step ST46, the voice recognizer 18 performs a recognition process with reference to the voice recognition dictionary 15, and outputs a recognition result character string "Nakata." Because no plurality of recognition object words matching "Nakata" exist in the storage 17, the controller 26 acquires, from the storage 17, the character string "Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball)" of the content (news body text) corresponding to the recognition result character string "Nakata" outputted by the voice recognizer 18.

After that, the controller 26 issues a command to generate a synthesized voice by using the character string of the acquired content (news body text) to the voice synthesizer 19 (in step ST48), acquires the synthesized voice generated by the voice synthesizer 19, and issues a command to output (present) the content (news body text) by using the synthesized voice to the speaker 4 (in step ST49).

As a result, the synthesized voice "Rakudai no Nakata ga kyo no gogo, kisyakaiken de dairigu e no iseki wo kibo shiteiru to happyo shimashita (Nakata of Rakudai announced at a press conference this afternoon that he wants to move to Major League Baseball)" is outputted from the speaker 4.

Although the explanation is made above on the assumption that the character string of the content (news body text) corresponding to the headline selected by the user is outputted via voice, as mentioned above, the controller 26 can alternatively display the character string of the acquired content (news body text) on the display 3 in accordance with the content information acquired in step ST47. As an alternative, the controller 26 presents the content both via display and via voice output.

As mentioned above, because the information providing system 20, which presents a plurality of headlines, selects one headline from these plurality of headlines, and presents information (content) corresponding to the headline selected thereby, is configured so as to, when there is an overlap among the recognition object words for selecting a headline, recognize the user's utterance of a recognition object word existing overlappedly, and, after that, determine new recognition object words not overlapping one another among the headlines, the information providing system 20 can prevent the user's misrecognition and acquire the information (content) corresponding to the headline selected by the user.

Although the example in which the extractor initially extracts all of the plurality of recognition object word candidates is explained in this Embodiment 2, the extractor can alternatively extract only the first recognition object word initially, and the object word determiner 23 can determine the first recognition object word as the recognition object word, and, when receiving a command for re-determination from the controller 26, determine the next candidate (second candidate) as the recognition object word.

Further, although the case in which the operation of narrowing down the headlines is performed once is explained as an example in this Embodiment 2, this embodiment is not limited to this example. This embodiment includes another example in which when there is an overlap among the recognition object words respectively corresponding to the headlines after the operation of narrowing down the headlines has been performed multiple times, the recognition object words of the headlines are generated dynamically in such a way that the recognition object words of the headlines differ from one another.

For example, it is assumed that there are ten headlines, and recognition object words (referred to as "A" from here on) corresponding to five of the ten headlines are the same. Further, it is assumed that as a result of utterance of "A", the ten headlines are narrowed down to the five headlines including "A", and a command to re-generate recognition object words is issued to the object word determiner 23.

At this time, the object word determiner 23 determines the second recognition object word candidates respectively brought into correspondence with the five headlines after narrowing-down as the recognition object words respectively corresponding to the headlines, regardless of whether or not there is an overlap among the second recognition object word candidates of the headlines. It is further assumed that, as a result, a recognition object word "B" exists overlappedly in two headlines.

When "B" is then uttered, the controller 26 narrows down the five headlines to the two headlines each including the recognition object word "B", and issues a command to re-generate the recognition object words to the object word determiner 23.

After that, the object word determiner 23 which receives the command dynamically generates the recognition object words of the headlines in such a way that the recognition object words of the headlines differ from each other because the recognition object word candidates overlapping each other, which are respectively brought into correspondence with the headlines after narrowing-down, are only the second candidates.

Although when there is an overlap among the recognition object word candidates and the recognition object word candidates overlapping each other are only second candidates, the object word determiner 23 dynamically generates the recognition object words of the headlines in such a way that the recognition object words of the headlines differ from one another, the object word determiner 23 can be alternatively configured so as to, when recognition object word candidates overlap each other after the operation of narrowing down has been performed a predetermined number of times (after the number of times that the command to re-generate the recognition object words has been issued by the controller 26 reaches a predetermined number of times), dynamically generate the recognition object words of the headlines in such a way that the recognition object words of the headlines differ from one another.

As mentioned above, because when there is an overlap among the recognition object words for selecting one headline from a plurality of headlines, the information providing system according to this Embodiment 2 recognizes the user's utterance of a recognition object words existing overlappedly, and, after that, determines new recognition object words which do not overlap one another among the headlines, the information providing system can prevent the user's misrecognition and improve the convenience to the user.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The information providing system according to the present invention can be applied to any type of device or equipment as long as the device or equipment presents a plurality of headlines, selects one headline from the above-mentioned plurality of headlines, and presents information (content) corresponding to the headline selected thereby. Further, the components of this information providing system can be decentralized among a server on a network, a mobile terminal such as a smart phone, vehicle-mounted equipment, etc.

REFERENCE SIGNS LIST 1, 20 information providing system, 2 network, 3 display, 4 speaker, 5 microphone, 10 acquirer, 11 analyzer, 12, 22 extractor, 13, 23 object word determiner, 14 dictionary generator, 15 voice recognition dictionary, 16, 26 controller, 17 storage, 18 voice recognizer, 19 voice synthesizer, 100 bus, 101 CPU, 102 ROM, 103 RAM, 104 input device, 105 communication device, 106 HDD, and 107 output device.

The invention claimed is:

1. An information providing system that presents a plurality of headlines, selects one of said plurality of headlines, and presents a piece of content corresponding to the headline selected thereby, said information providing system comprising:

an extractor to acquire said plurality of headlines, and to extract recognition object word candidates from said headlines acquired thereby, respectively;

an object word determiner to acquire the recognition object word candidates of said headlines from said extractor, and to generate recognition object words of said headlines in accordance with said acquired recognition object word candidates of said headlines; and a controller to, when a voice recognition result acquired from a voice matches a recognition object word generated by said object word determiner, issue a command to present a piece of content corresponding to a headline from which the recognition object word matching said voice recognition result is determined, wherein when recognition object word candidates overlapping each other exist in said acquired recognition object word candidates of said headlines, said object word determiner dynamically generates the recognition object words of said headlines in such a way that the recognition object words of said headlines differ from one another.

2. The information providing system according to claim 1, wherein when recognition object word candidates overlapping each other exist in said acquired recognition object word candidates of said headlines, said object word determiner processes at least one of said recognition object word candidates overlapping each other, to dynamically generate the recognition object words of said headlines in such a way that the recognition object words differ from one another.

3. The information providing system according to claim 2, wherein said object word determiner identifies either a presentation position or a position in presentation order of a headline including one of said recognition object word candidates overlapping each other, and processes said one of the recognition object word candidates in accordance with either said presentation position or said position in the presentation order, which is identified thereby.

4. The information providing system according to claim 2, wherein said object word determiner processes one of said recognition object word candidates overlapping each other by adding either another word or a word string to said one of the recognition object word candidates.

5. The information providing system according to claim 1, wherein when recognition object word candidates overlapping each other exist in said acquired recognition object word candidates of the headlines, said object word determiner replaces at least one of said recognition object word candidates overlapping each other with another recognition object word candidate.

6. The information providing system according to claim 5, wherein said object word determiner analyzes a meaning of a headline including the one of said recognition object word candidates overlapping each other, determines a term corresponding to said meaning as the other recognition object word candidate, and replaces at least the one of said recognition object word candidates overlapping each other with the other recognition object word candidate.

7. The information providing system according to claim 5, wherein said object word determiner replaces the one of said recognition object word candidates overlapping each other with another recognition object word candidate included in a headline including the one of said recognition object word candidates.

8. The information providing system according to claim 1, wherein before dynamically generating the recognition object words of said headlines in such away that the recognition object words of said headlines differ from one another, said object word determiner determines said recognition object word candidates as the recognition object words of said headline, respectively, regardless of whether recognition object word candidates overlapping each other exist in said acquired recognition object word candidates of the headlines, and when the voice recognition result acquired from the voice matches a plurality of recognition object words determined by said object word determiner, said controller narrows down said headlines to two or more headlines from which said recognition object words identical to each other are determined, and commands said object word determiner to re-generate a recognition object word candidate different from said recognition object word candidates overlapping each other as a recognition object word for each of said headlines after narrowing-down.

9. The information providing system according to claim 1, wherein said object word determiner dynamically generates said recognition object words in such a way that each of said recognition object words differs from any operating command for equipment.

* * * * *